(12) United States Patent
Ito

(10) Patent No.: US 11,718,351 B2
(45) Date of Patent: Aug. 8, 2023

(54) AUTOMOBILE STRUCTURAL MEMBER AND VEHICLE BODY

(71) Applicant: NIPPON STEEL CORPORATION, Tokyo (JP)

(72) Inventor: Yasuhiro Ito, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 86 days.

(21) Appl. No.: 17/259,076

(22) PCT Filed: Jul. 11, 2019

(86) PCT No.: PCT/JP2019/027613
§ 371 (c)(1),
(2) Date: Jan. 8, 2021

(87) PCT Pub. No.: WO2020/013303
PCT Pub. Date: Jan. 16, 2020

(65) Prior Publication Data
US 2021/0155294 A1    May 27, 2021

(30) Foreign Application Priority Data

Jul. 11, 2018   (JP) ................................. 2018-131892
Jul. 11, 2018   (JP) ................................. 2018-131893

(51) Int. Cl.
*B62D 25/04*    (2006.01)
*B62D 25/02*    (2006.01)
*B60R 19/18*    (2006.01)

(52) U.S. Cl.
CPC .............. *B62D 25/04* (2013.01); *B60R 19/18* (2013.01); *B62D 25/025* (2013.01)

(58) Field of Classification Search
CPC ...... B62D 25/025; B62D 25/20; B62D 25/04; B62D 25/2018; B62D 25/2027;
(Continued)

(56) References Cited

U.S. PATENT DOCUMENTS 4,413,485 A * 11/1983 Larikka ................... B23B 51/08
72/71
6,898,836 B2 * 5/2005 Barber .................. B21C 23/085
29/515

(Continued)

FOREIGN PATENT DOCUMENTS

DE   11 2008 004 065 B4   10/2013
JP          54-63315 U     5/1979
(Continued)

*Primary Examiner* — Dennis H Pedder
(74) *Attorney, Agent, or Firm* — Birch, Stewart, Kolasch & Birch, LLP

(57) ABSTRACT

An automobile structural member has a first wall part, a second wall part that faces the first wall part, and a third wall part that connects the first wall part and the second wall part. At least one of the first wall part and the second wall part has a main wall part in which two through-holes are formed, and at least two auxiliary wall parts that are provided so as to rise from the main wall part. Each auxiliary wall part is provided so as to rise in the thickness direction of the main wall part from an edge of a through-hole. The distance between two auxiliary wall parts in the longitudinal direction of the main wall part is 1.4 times or less the width of the main wall part at a portion between the two auxiliary wall parts.

15 Claims, 32 Drawing Sheets

(58) Field of Classification Search
CPC ............ B60R 19/18; B60R 2019/1806; B60R 2019/1813; B60R 2019/1826; B60R 2019/182
USPC ................... 296/209, 204, 193.06; 293/102
See application file for complete search history.

(56) References Cited

U.S. PATENT DOCUMENTS

| | | | |
|---|---|---|---|
| 2009/0140551 A1* | 6/2009 | Stalhammar | B62D 25/04 |
| | | | 296/193.06 |
| 2011/0210581 A1 | 9/2011 | Kunishi et al. | |
| 2018/0162451 A1 | 6/2018 | Kim | |
| 2018/0251160 A1 | 9/2018 | Hamada et al. | |

FOREIGN PATENT DOCUMENTS

| | | |
|---|---|---|
| JP | 63-32969 U | 3/1988 |
| JP | 9-123941 A | 5/1997 |
| JP | 2010-95176 A | 4/2010 |
| JP | 2017-39338 A | 2/2017 |
| WO | WO 2017/030191 A1 | 2/2017 |

* cited by examiner

[Fig.1]
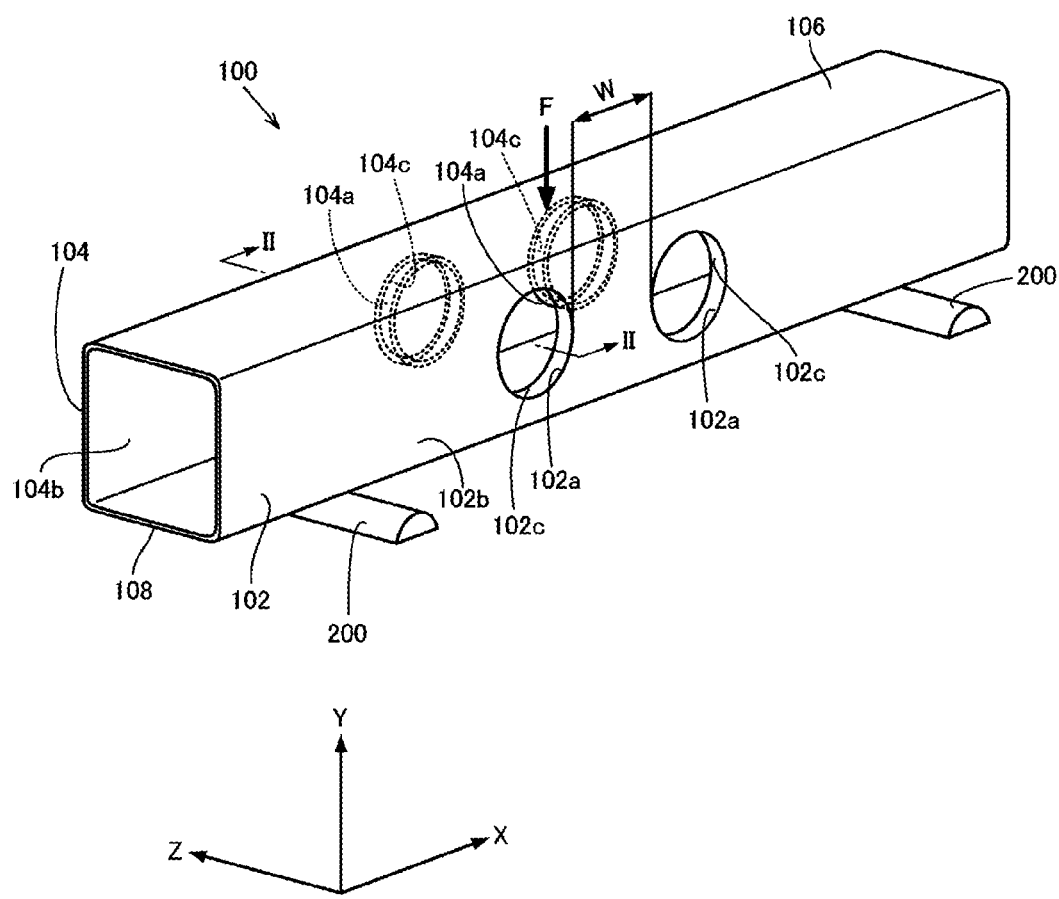

[Fig.2]
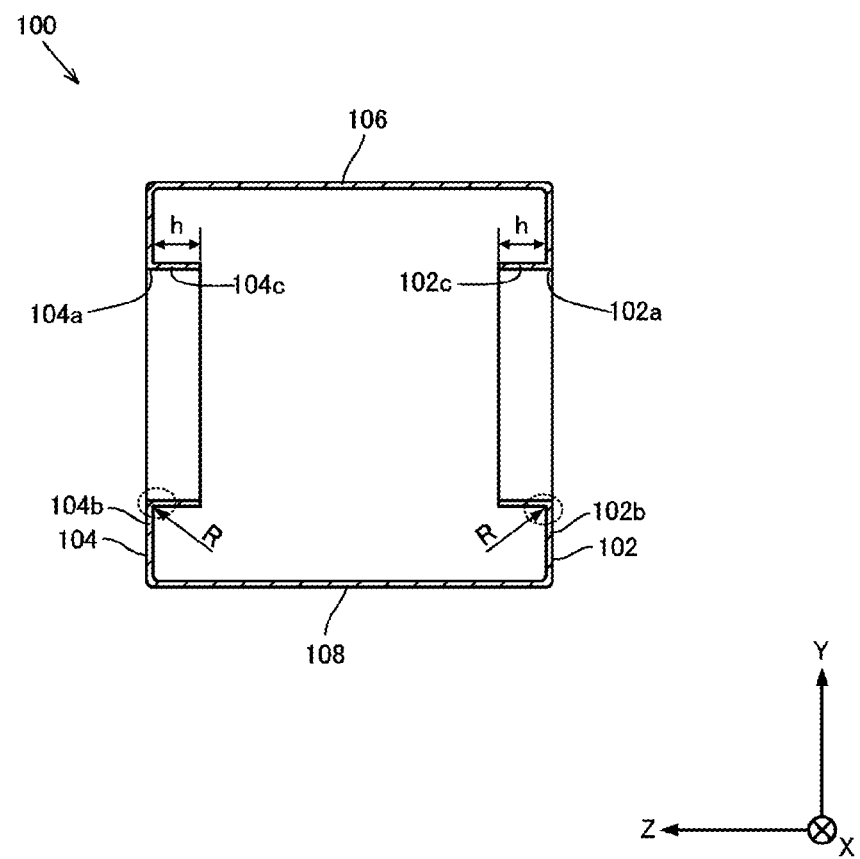

[Fig.3]
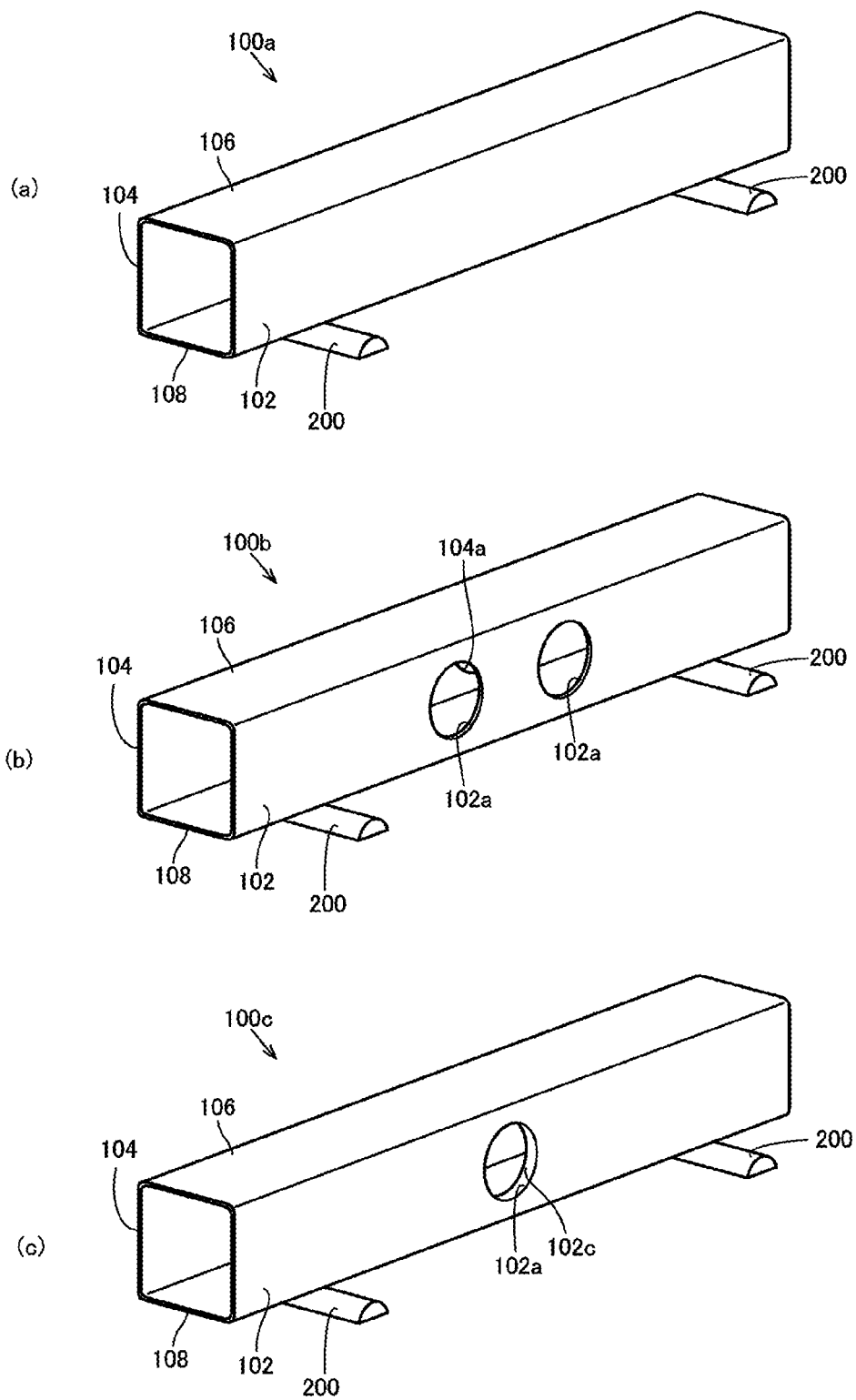

[Fig.4]
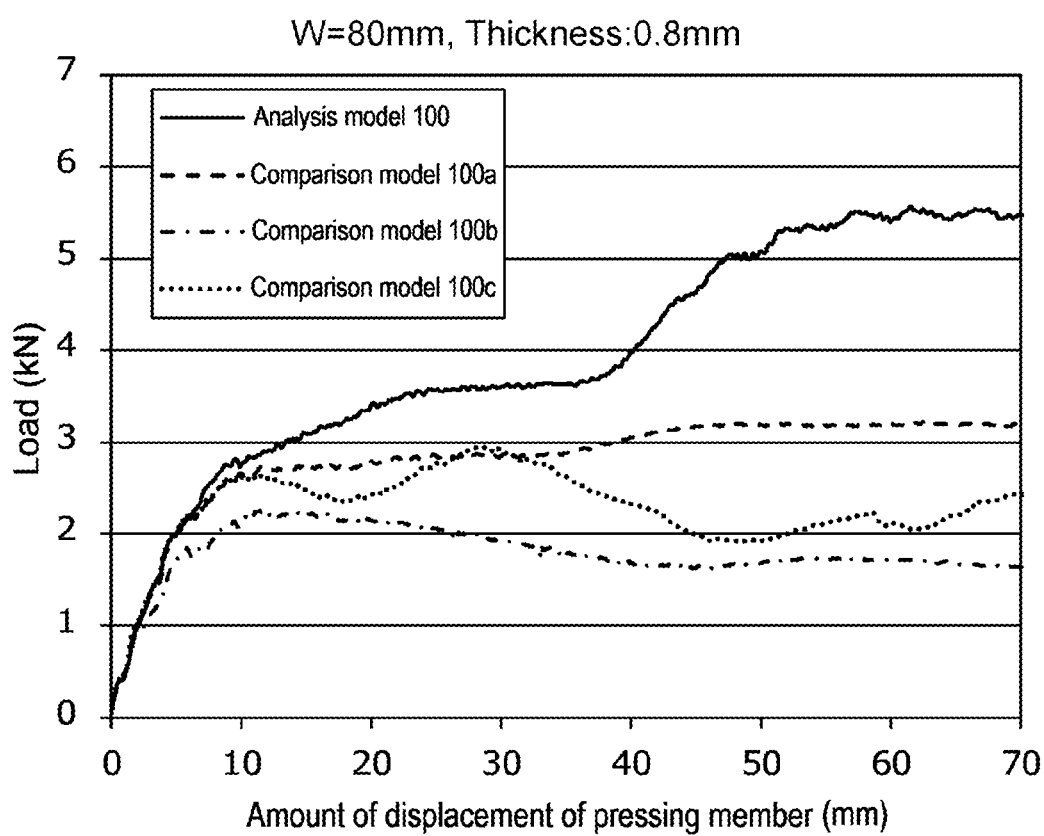

[Fig.5]
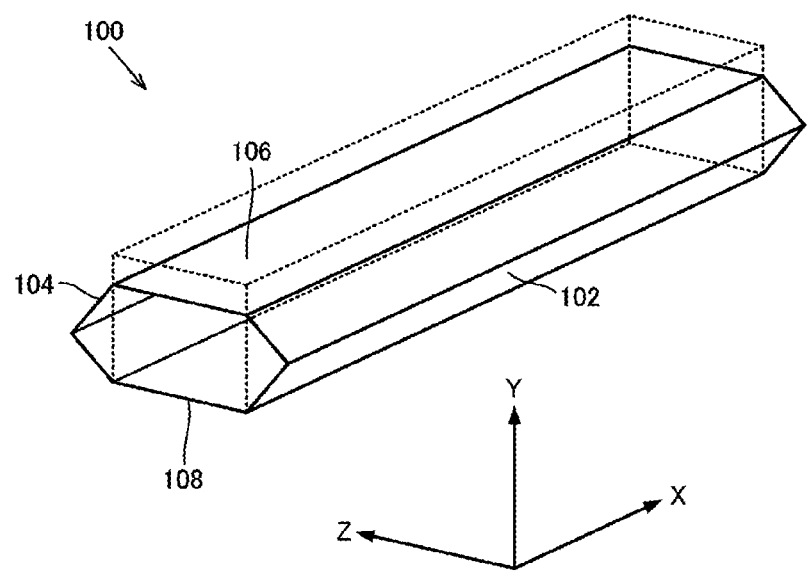

[Fig.6]
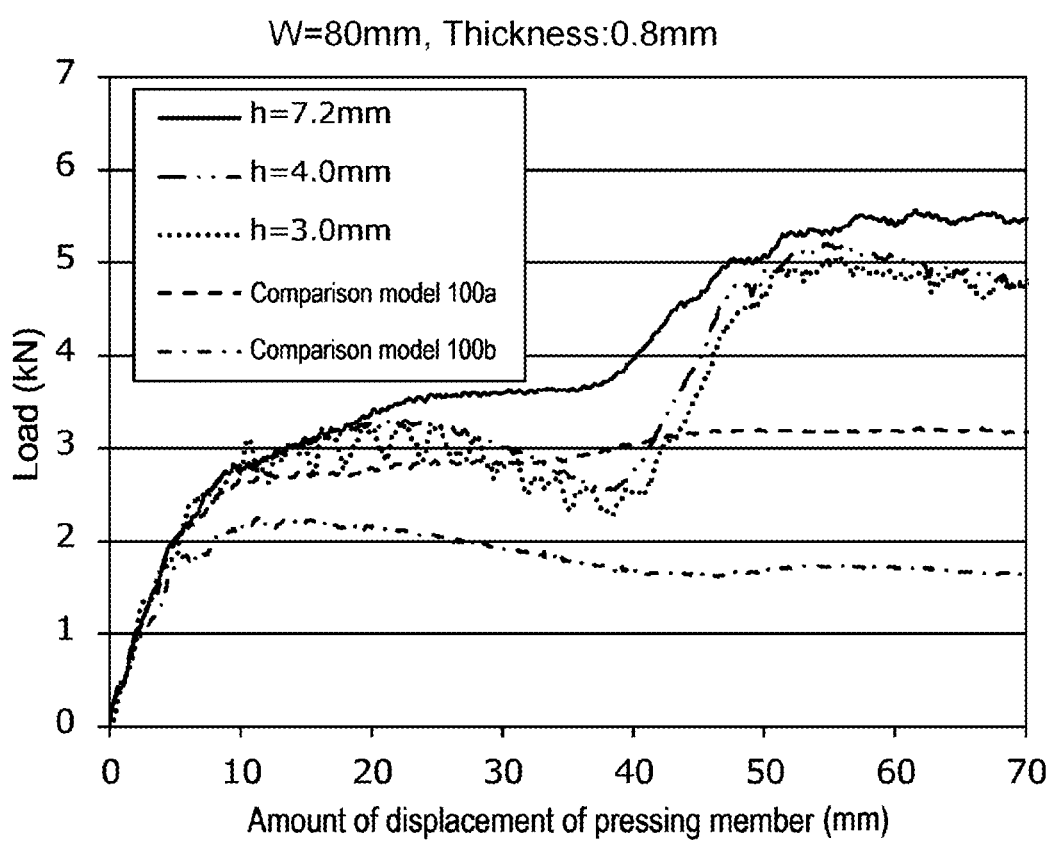

[Fig.7]
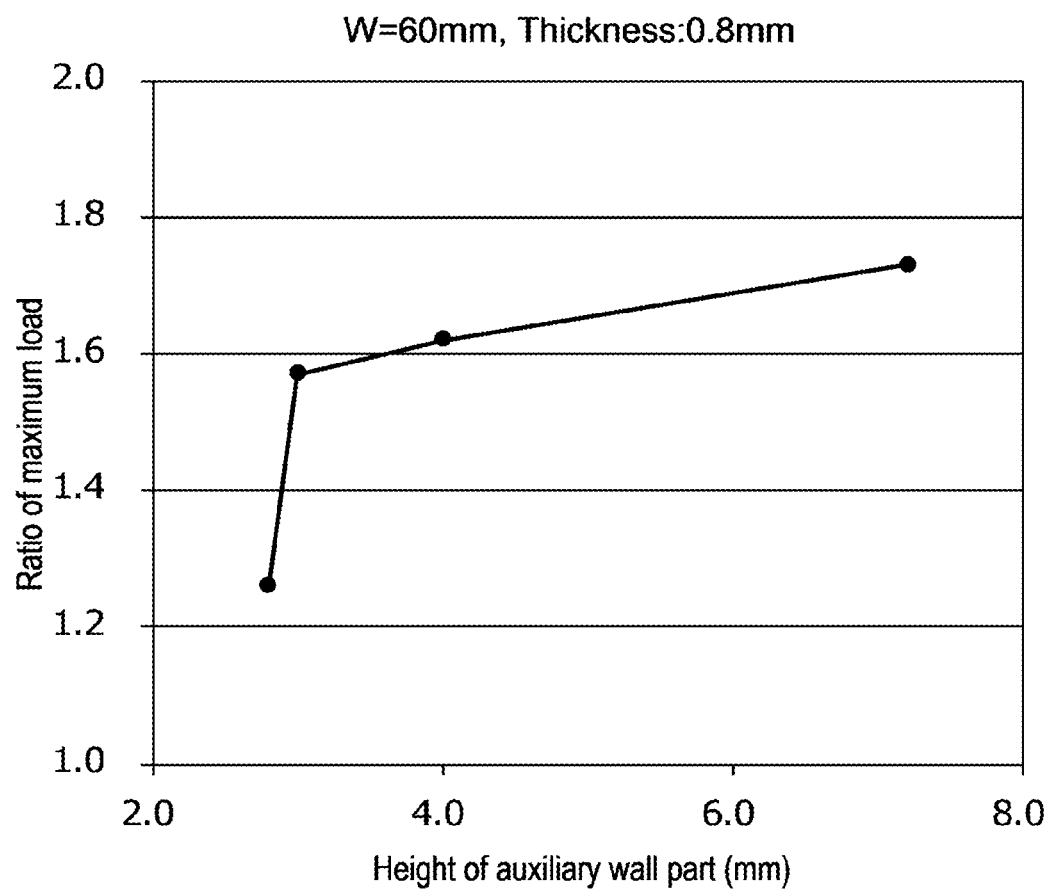

[Fig.8]
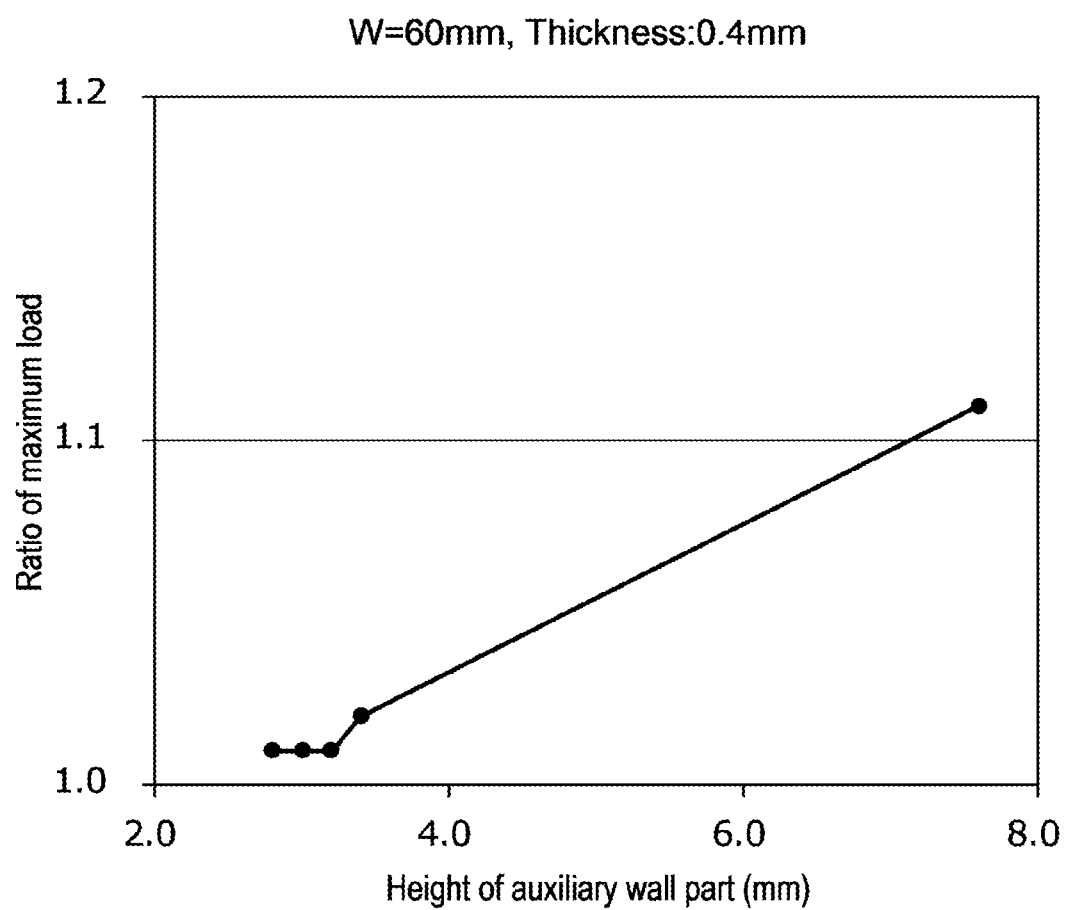

[Fig.9]
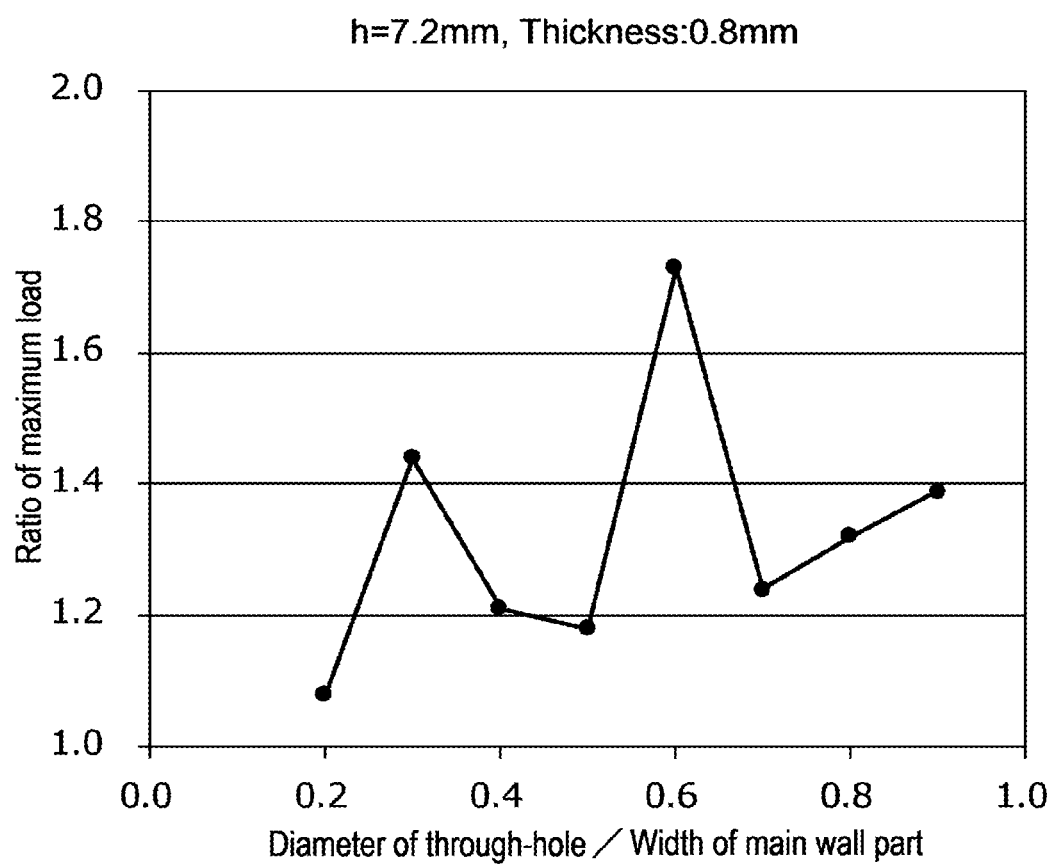

[Fig.10]
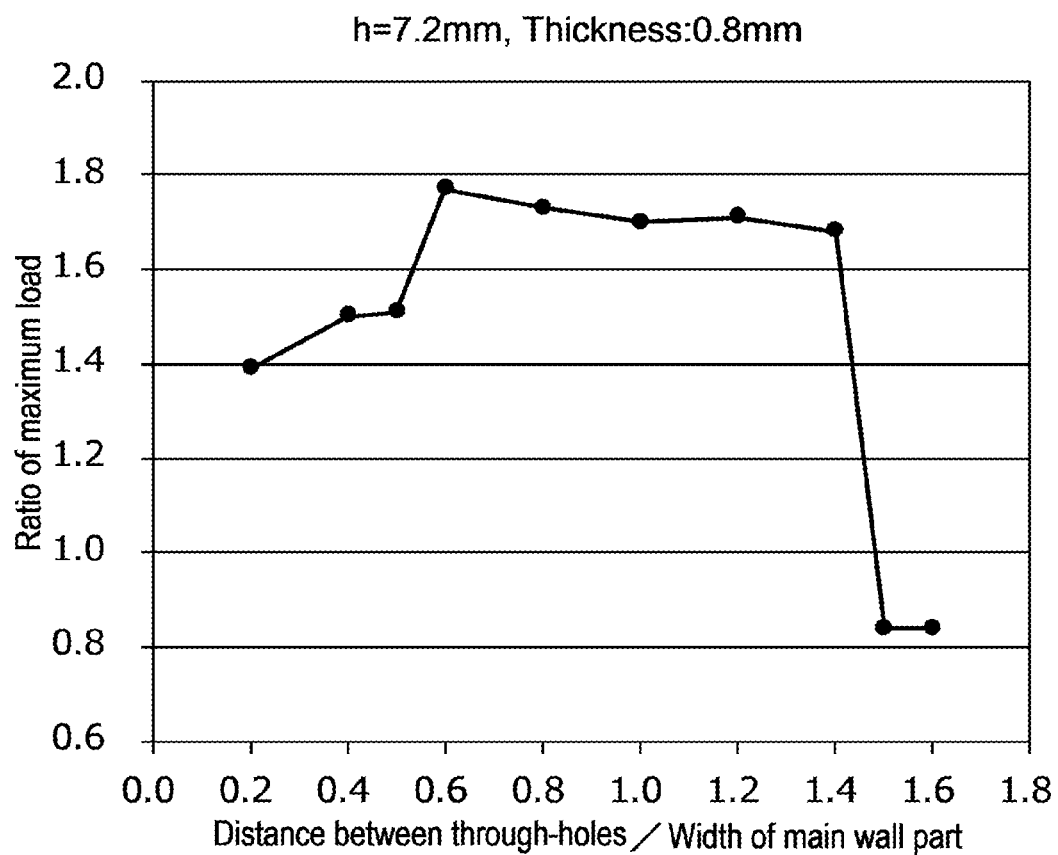

[Fig.11]
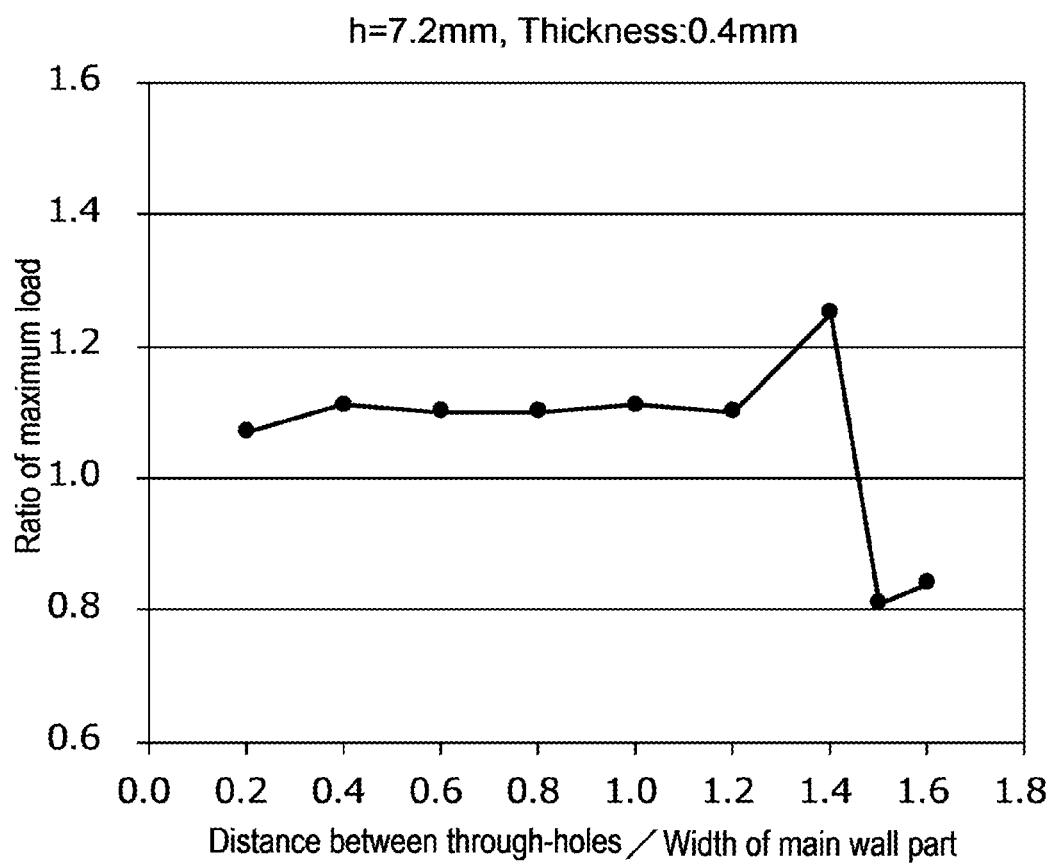

[Fig.12]
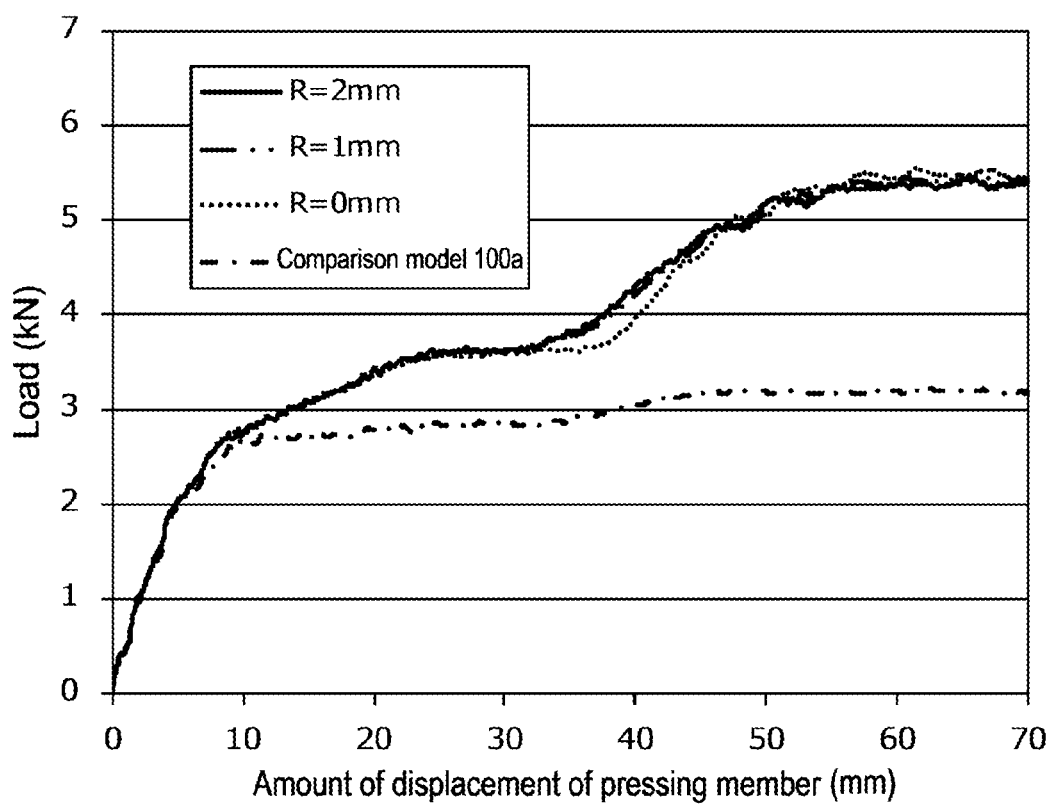

[Fig.13]
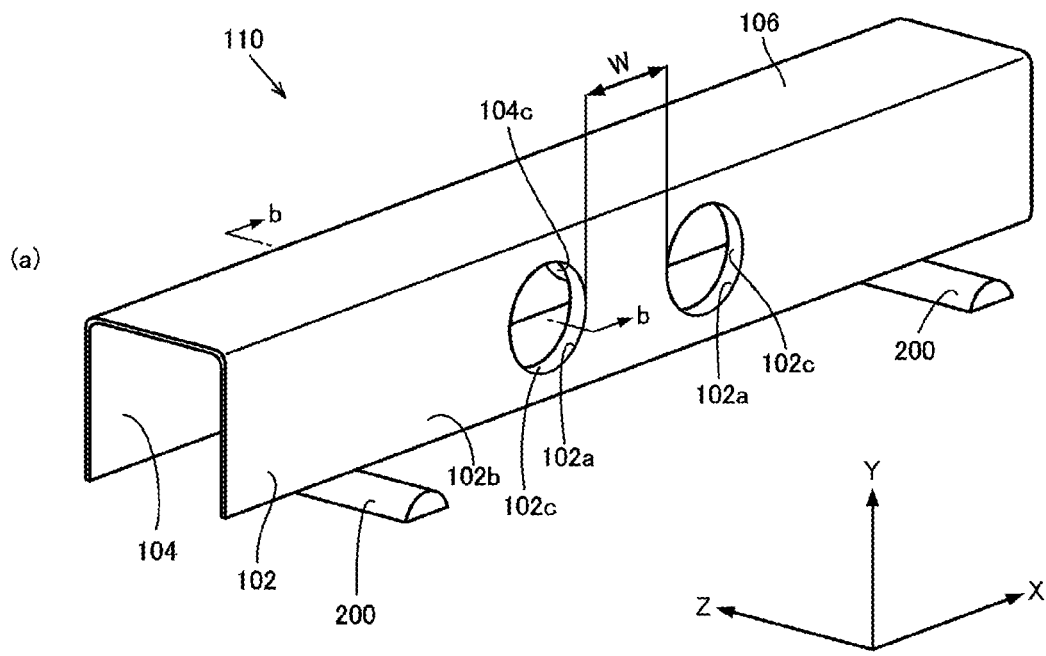
(a)
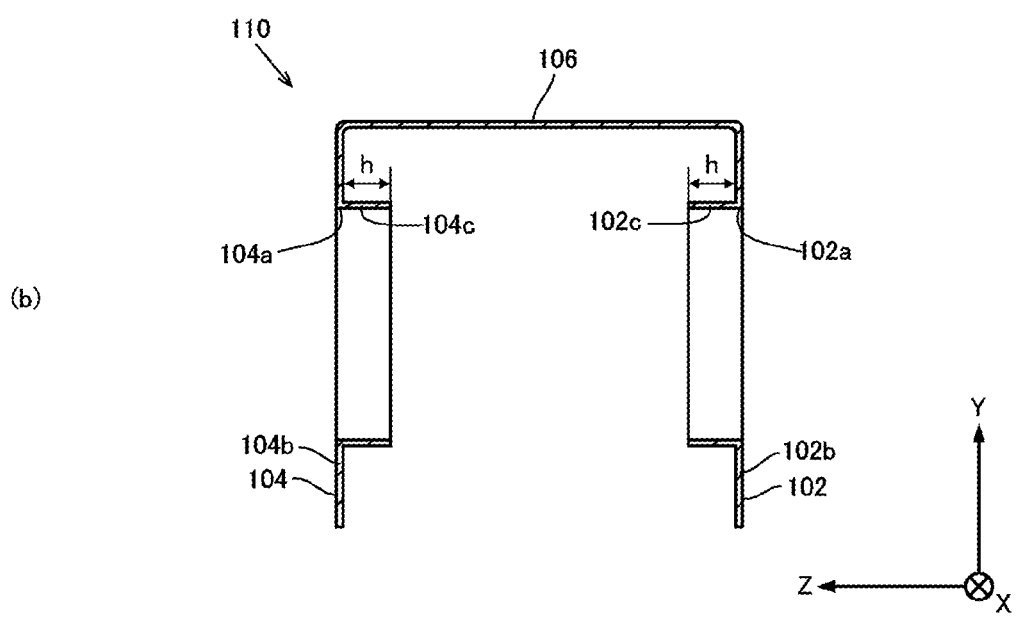
(b)

[Fig.14]
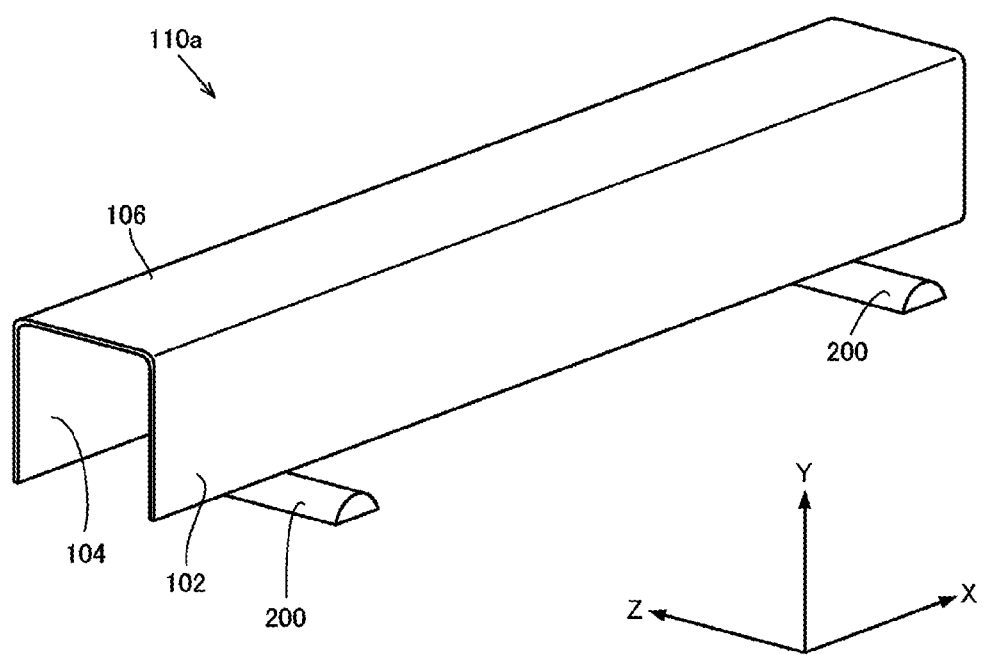

[Fig.15]
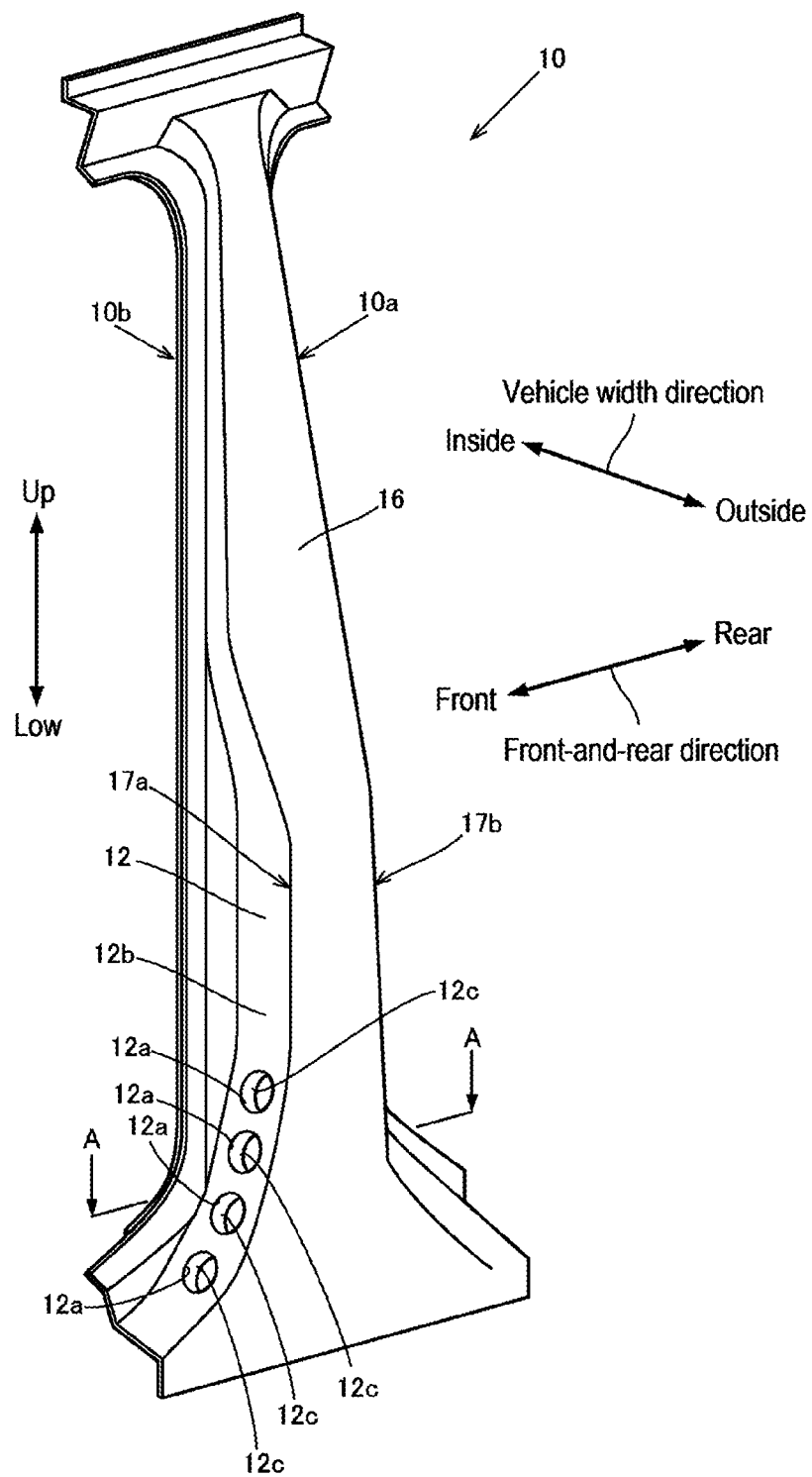

[Fig.16]
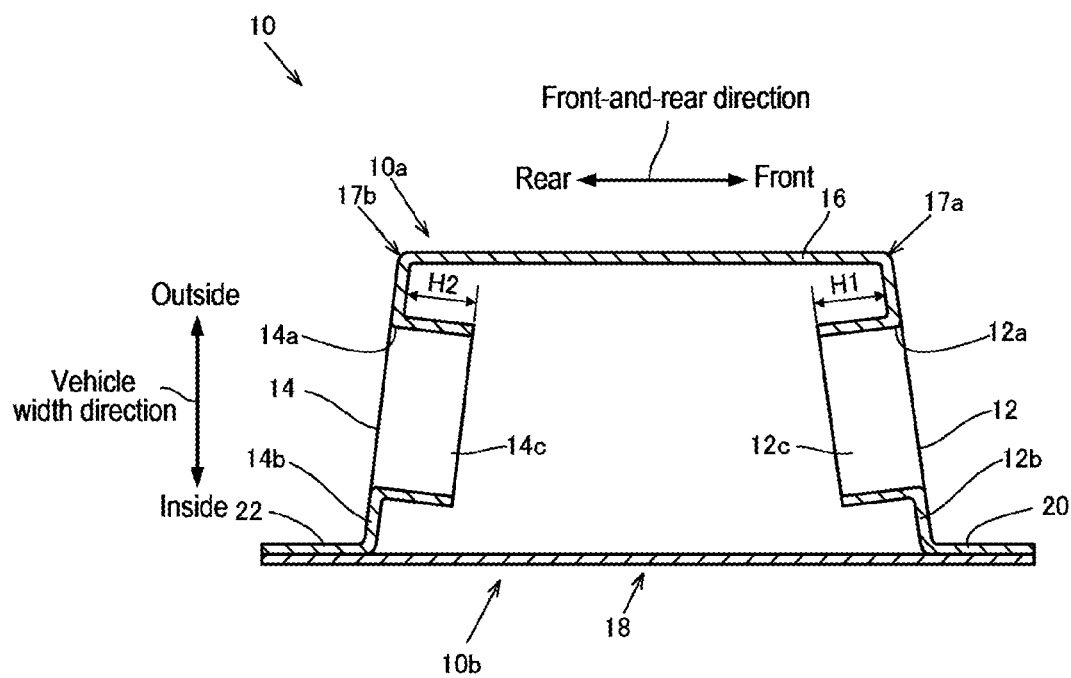

[Fig.17]
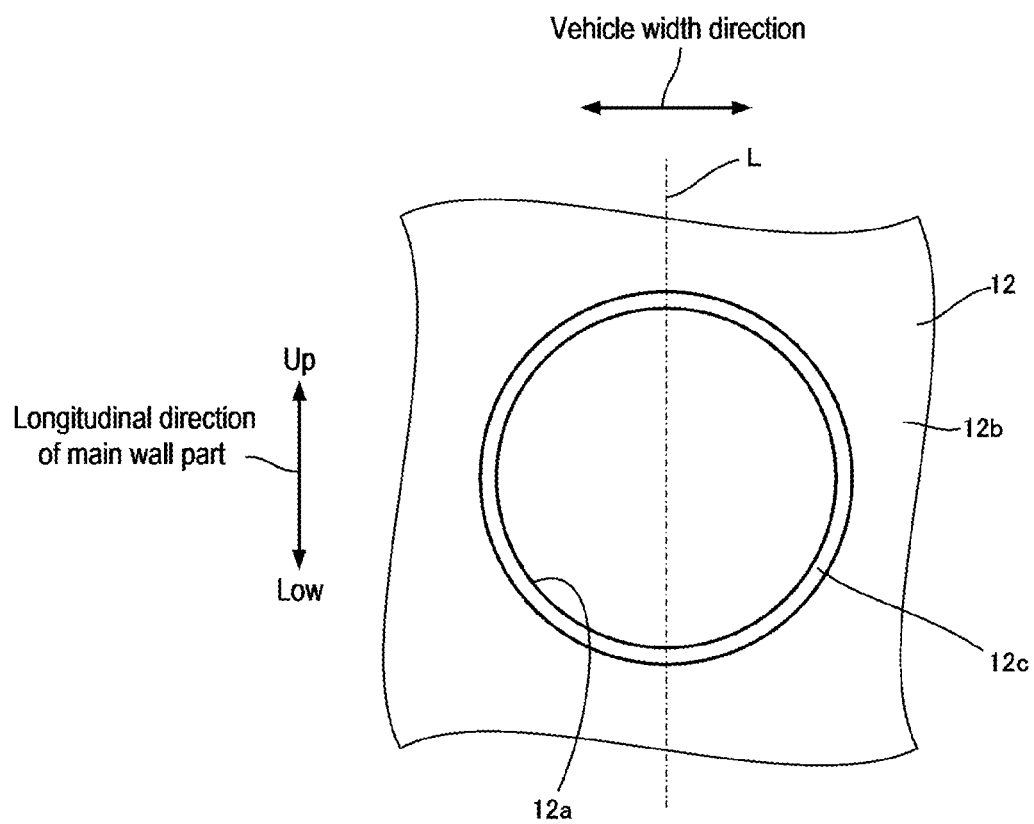

[Fig.18]
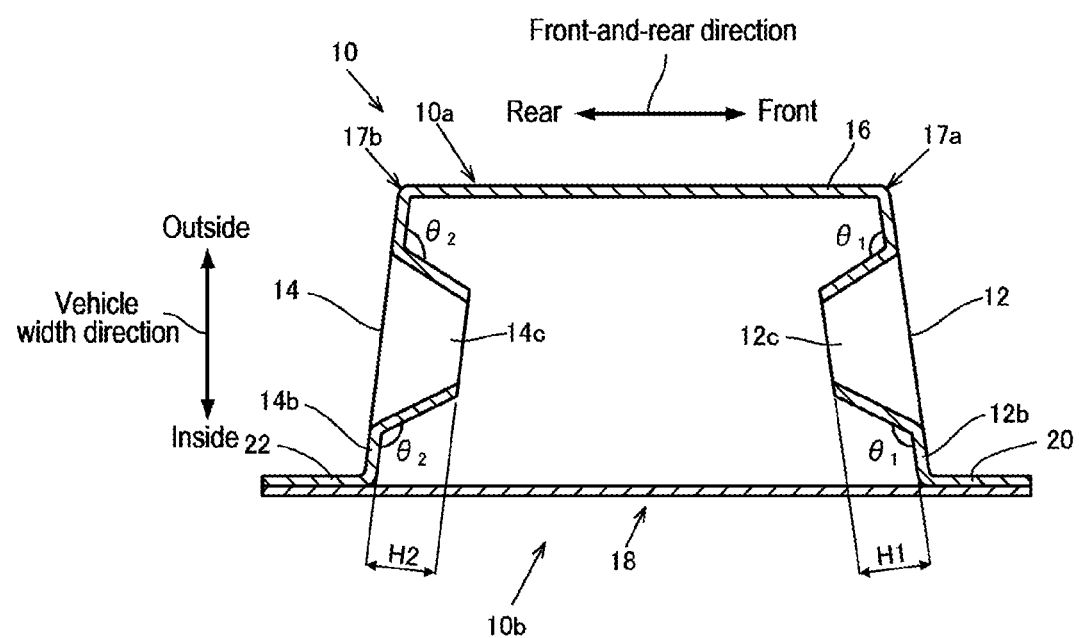

[Fig.19]
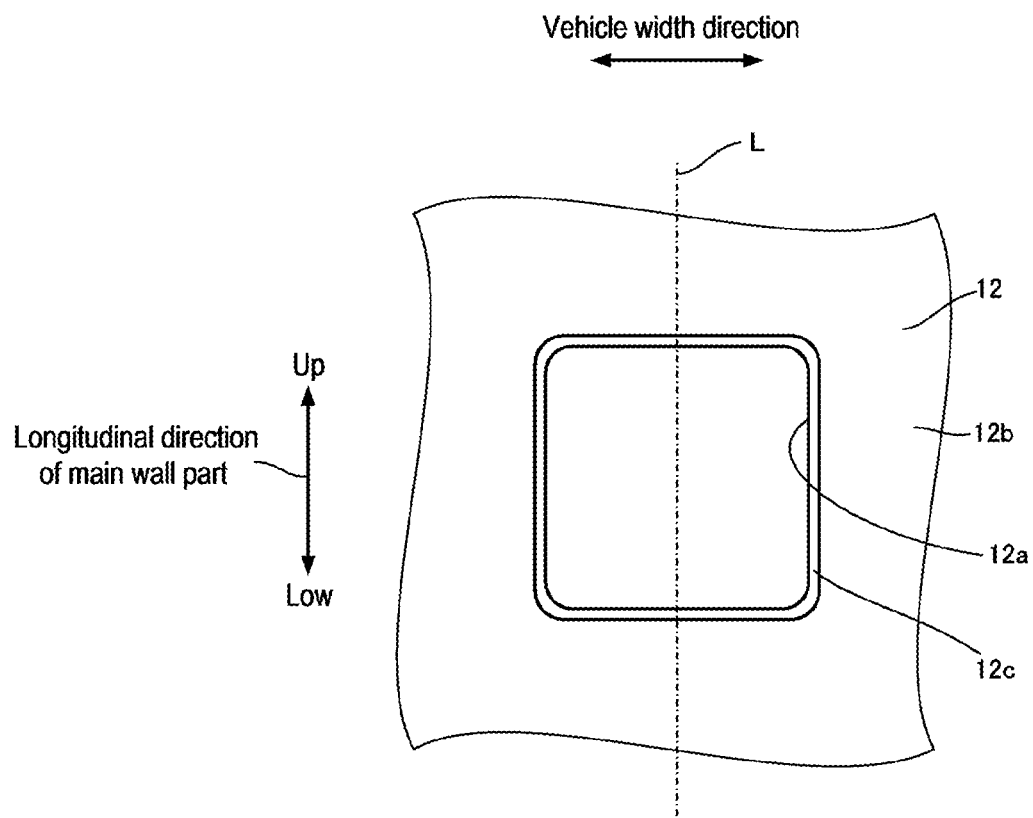

[Fig.20]
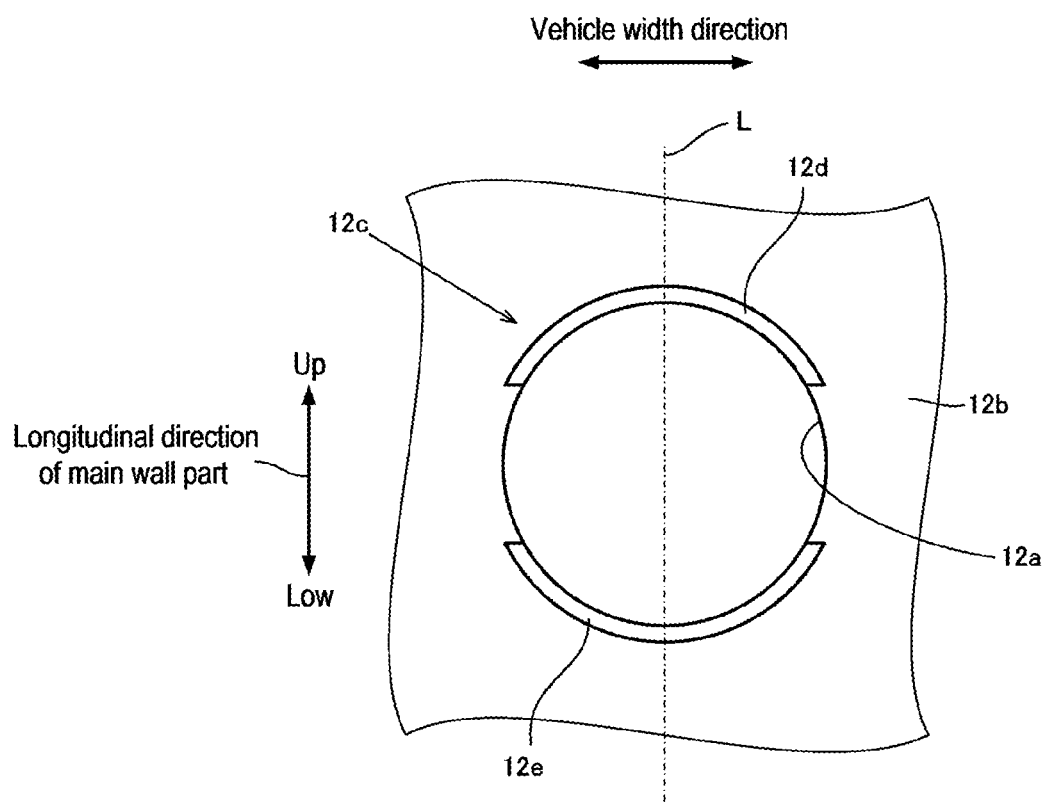

[Fig.21]
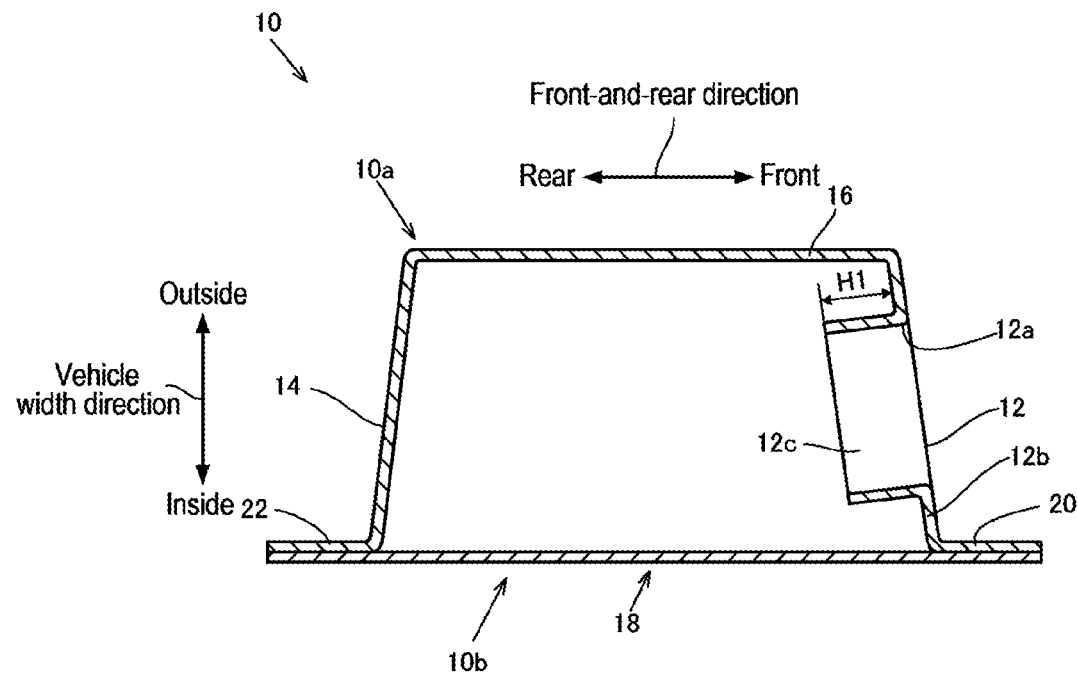
[Fig.22]
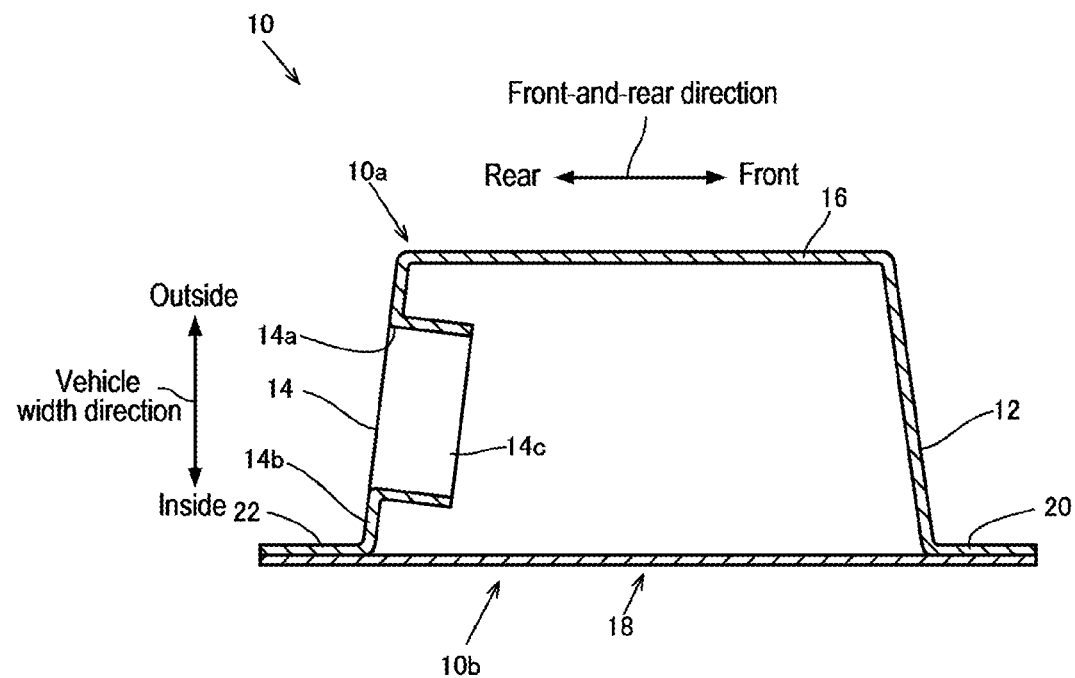

[Fig.23]
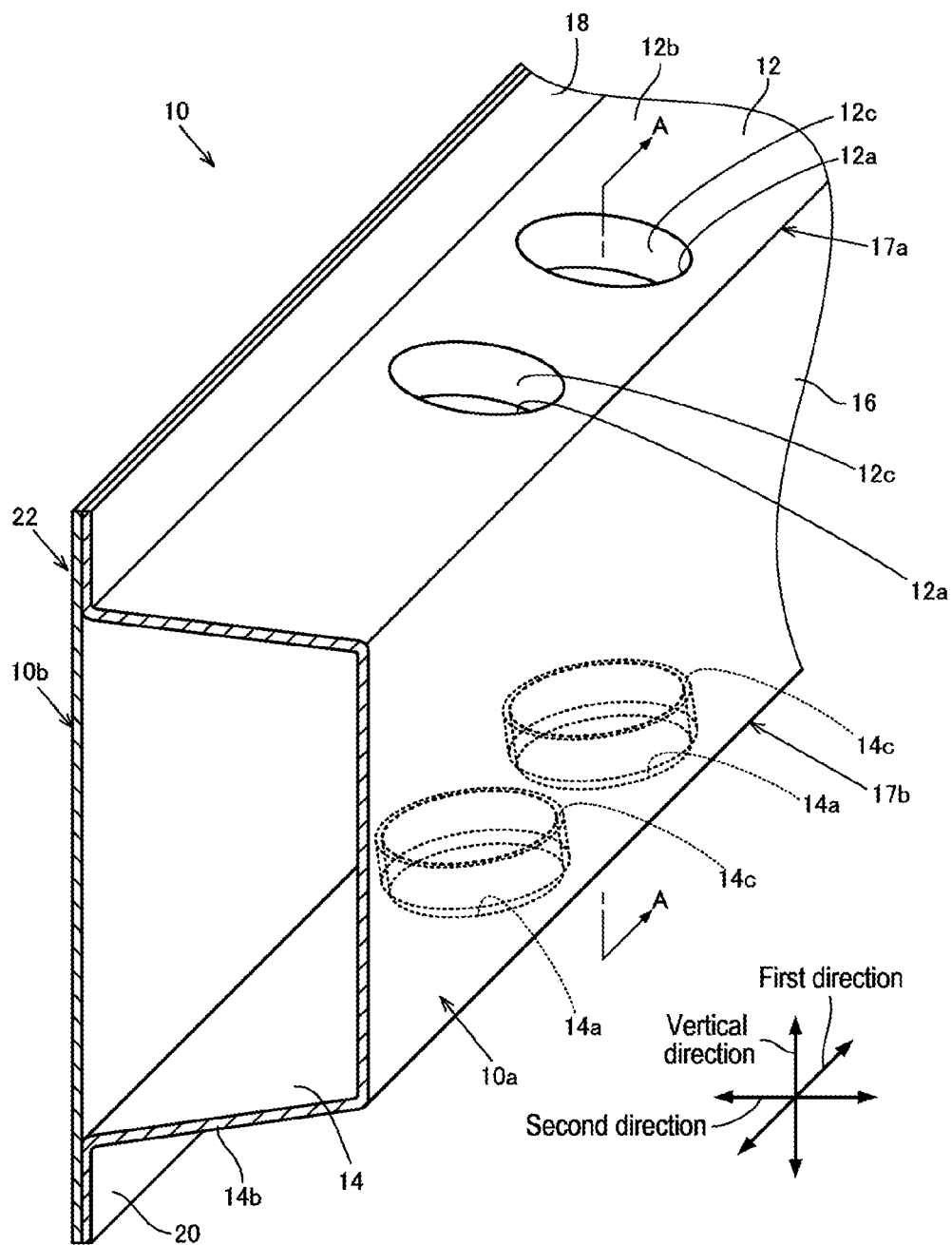

[Fig.24]
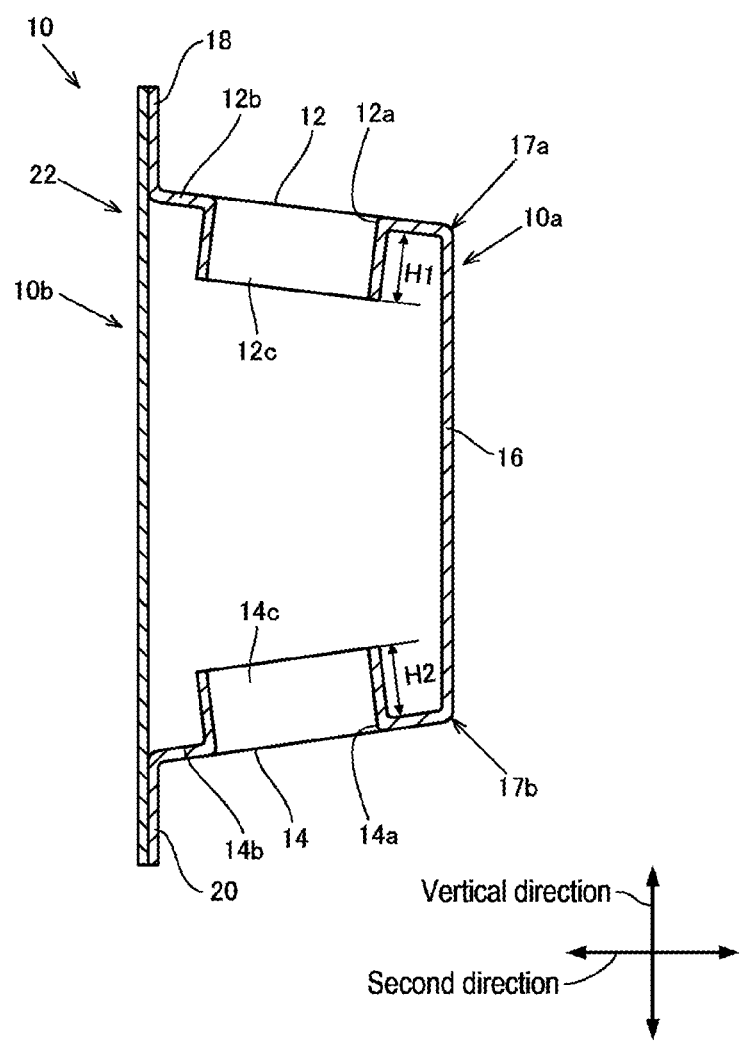

[Fig.25]
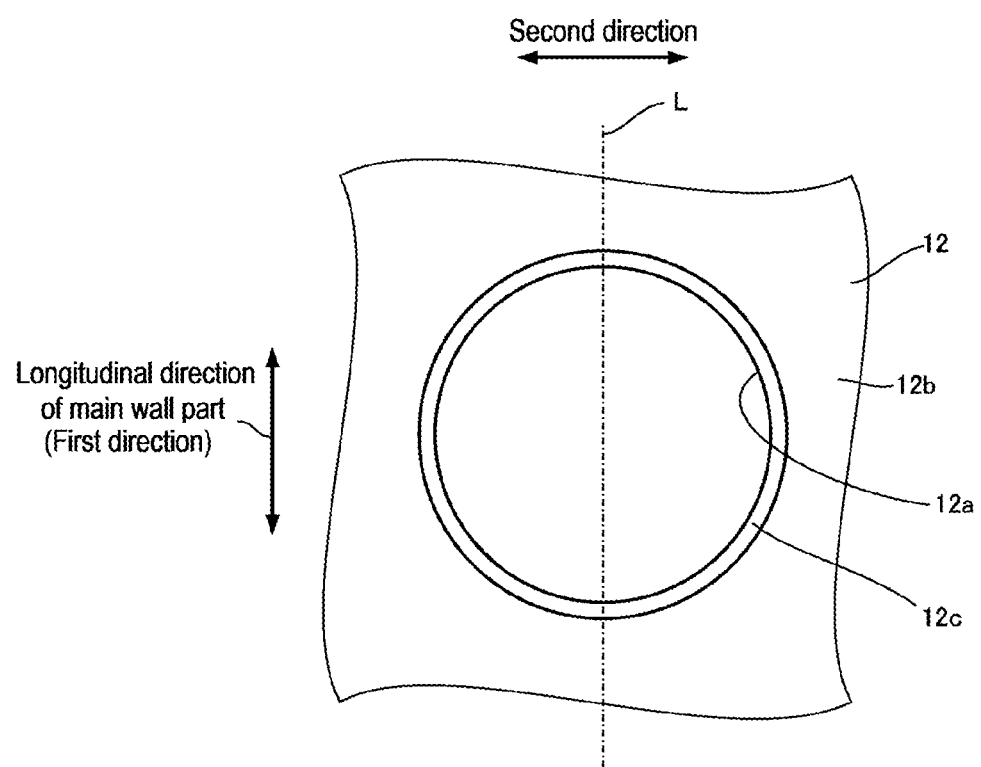

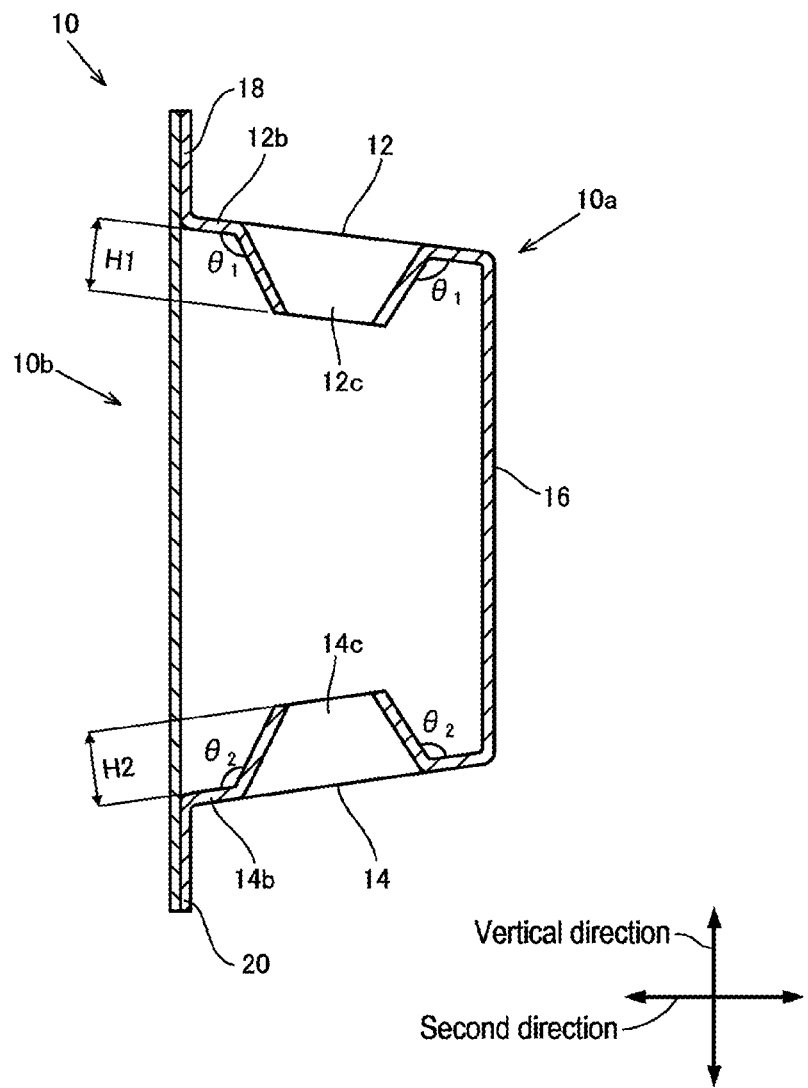
[Fig.26]

[Fig.27]
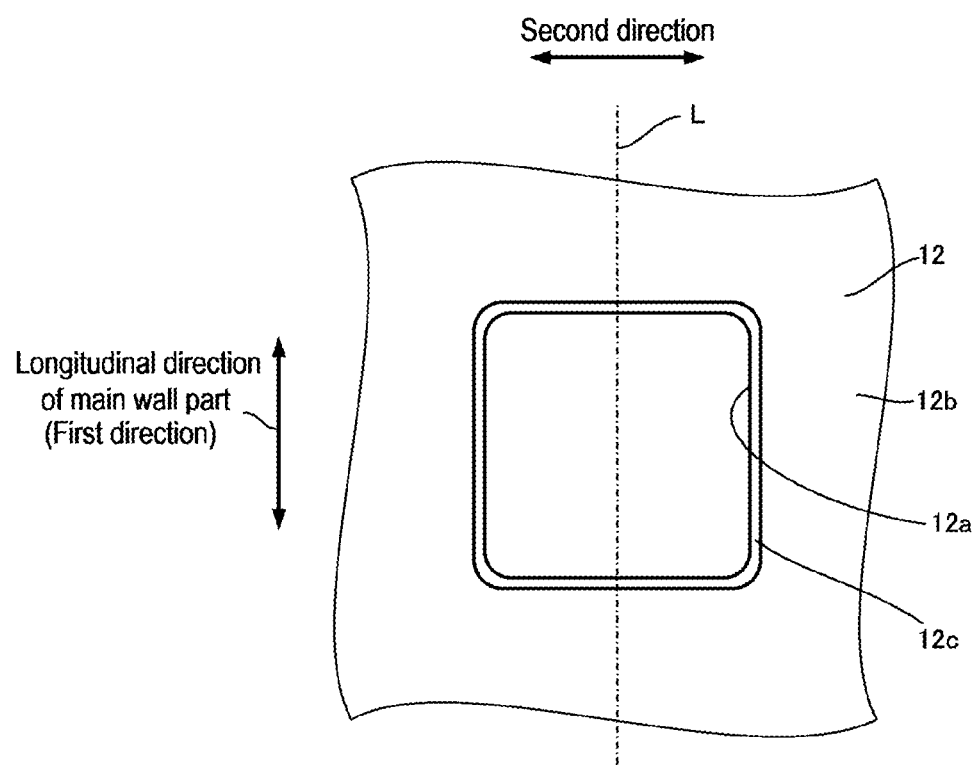

[Fig.28]
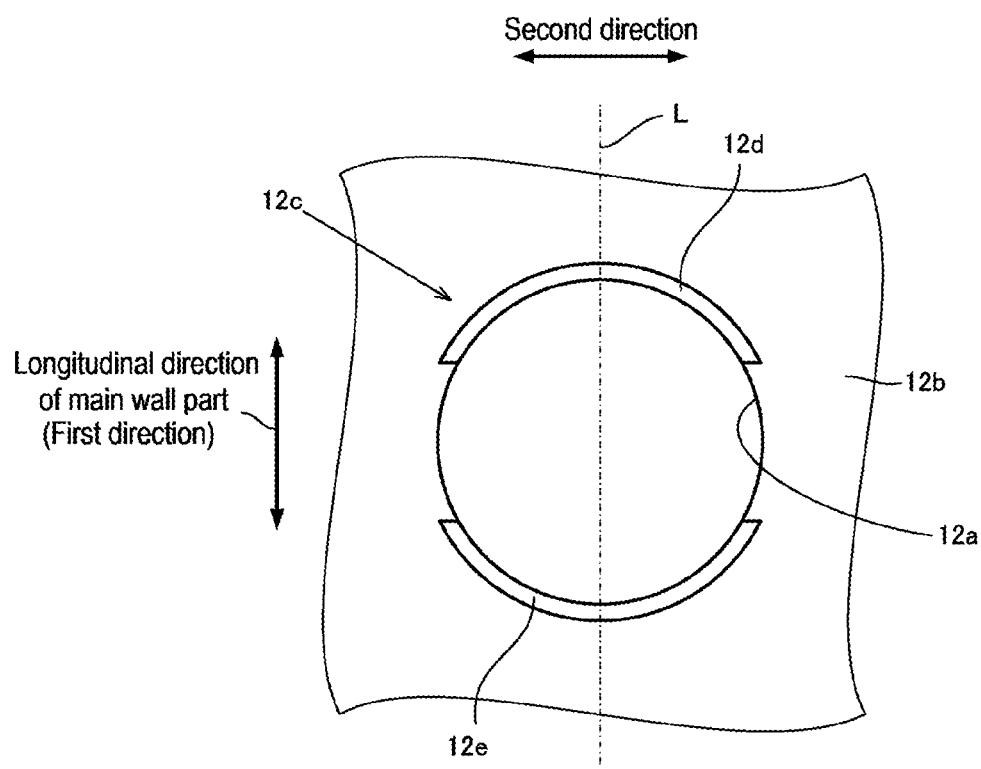

[Fig.29]
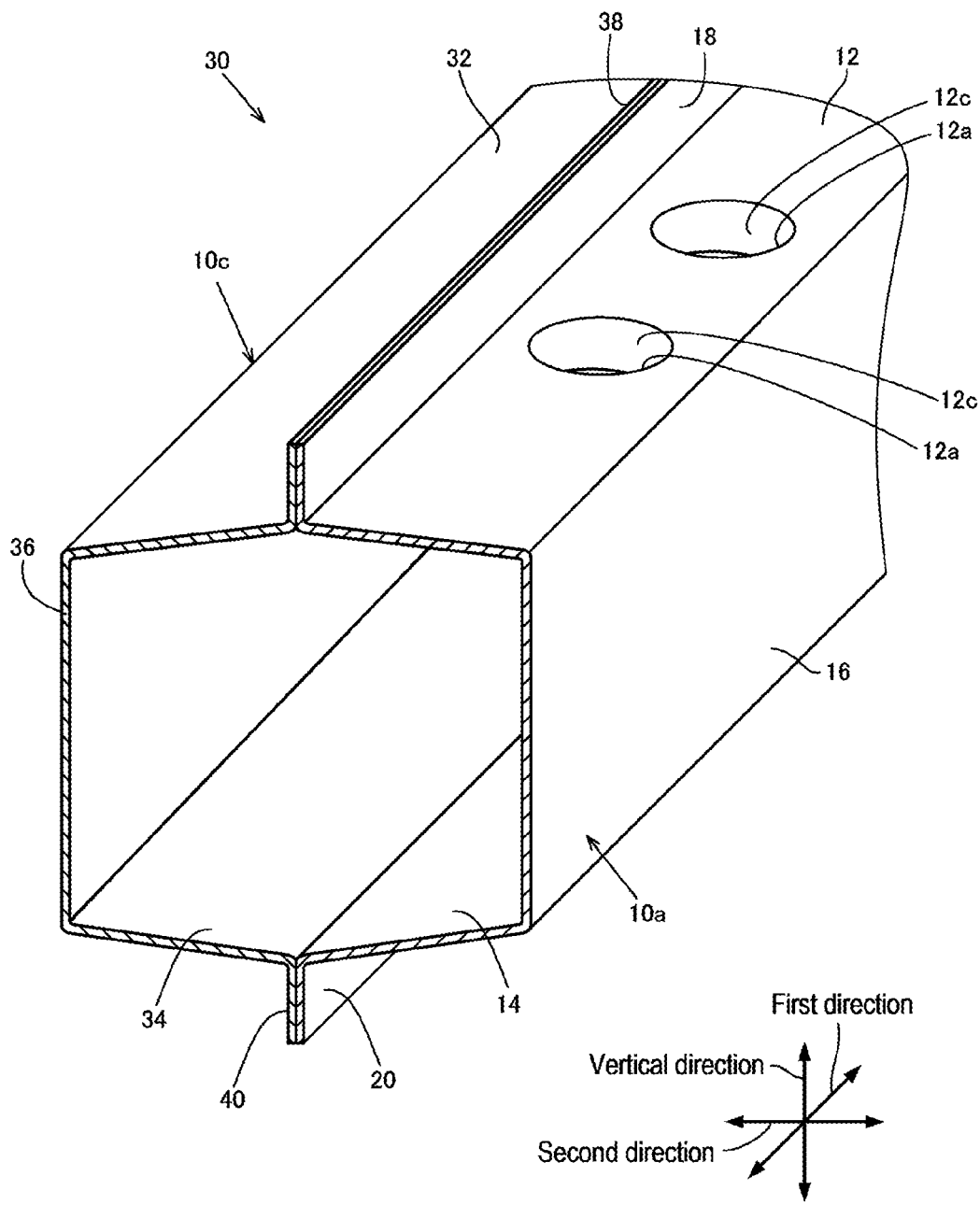

[Fig.30]
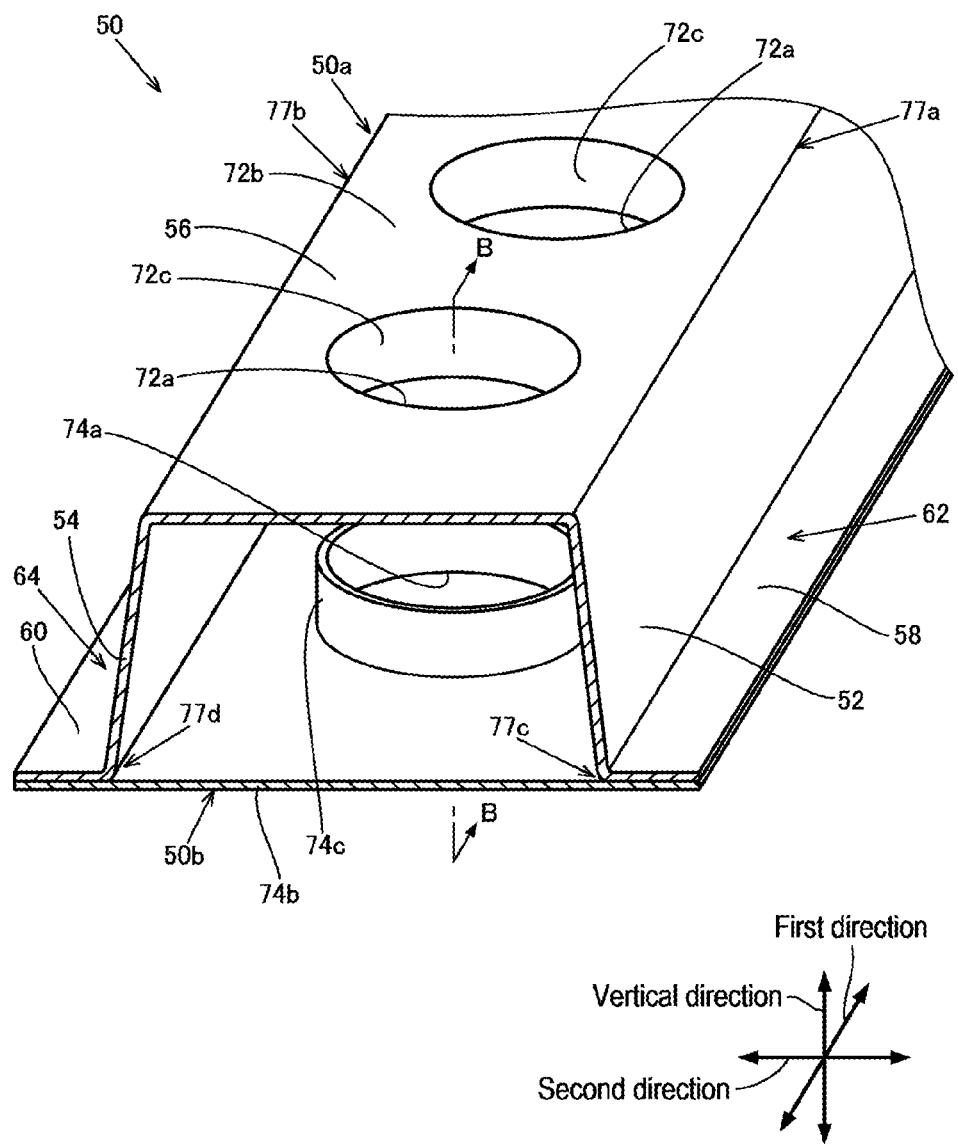

[Fig.31]
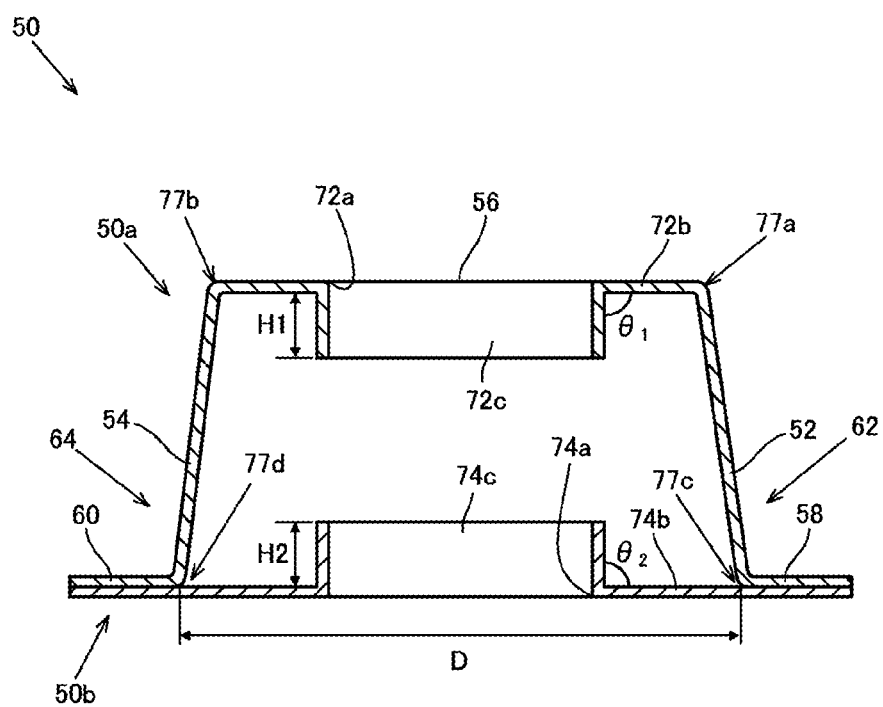
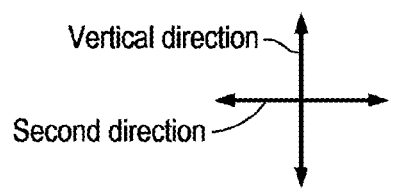

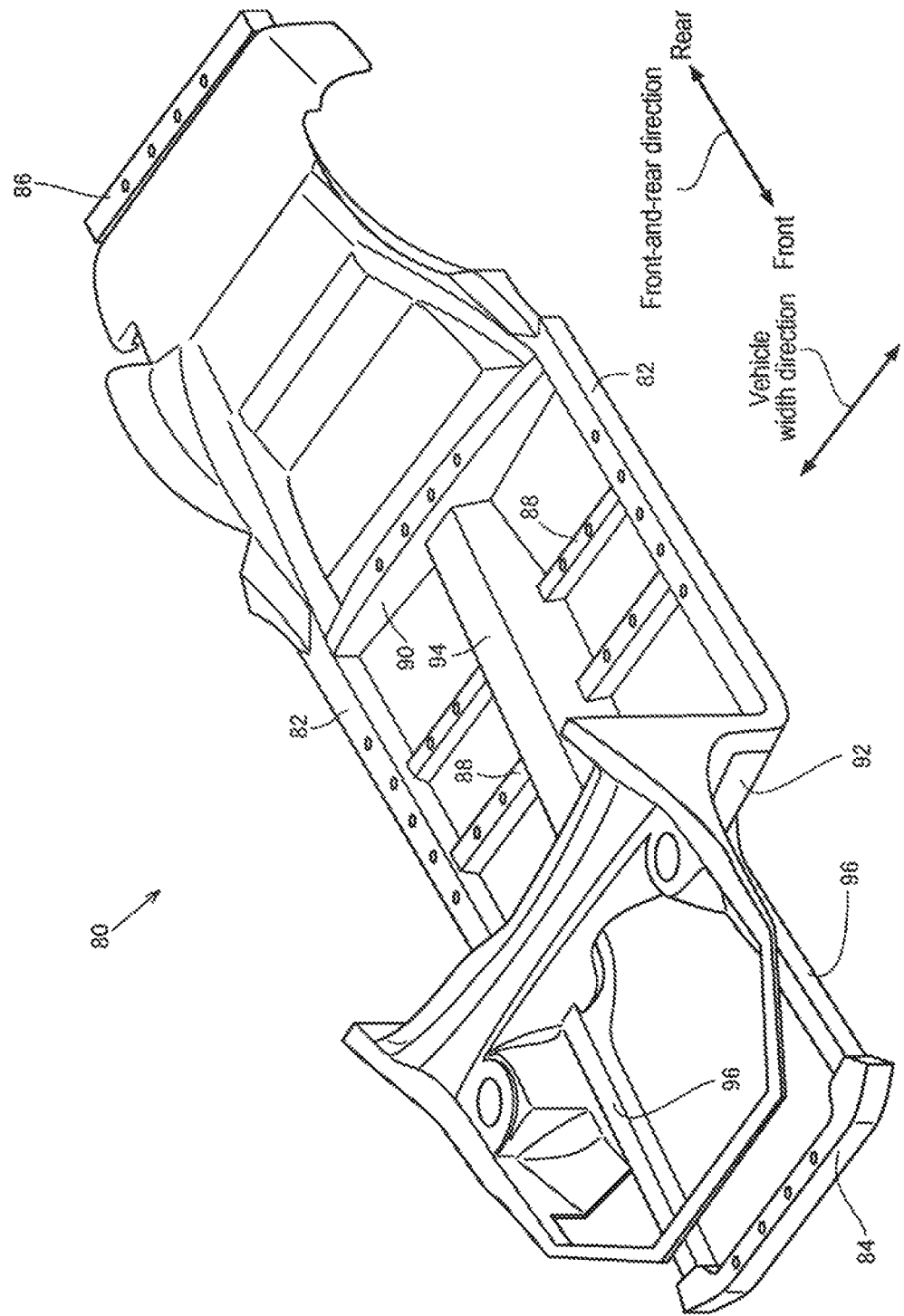
[Fig. 32]

[Fig.33]
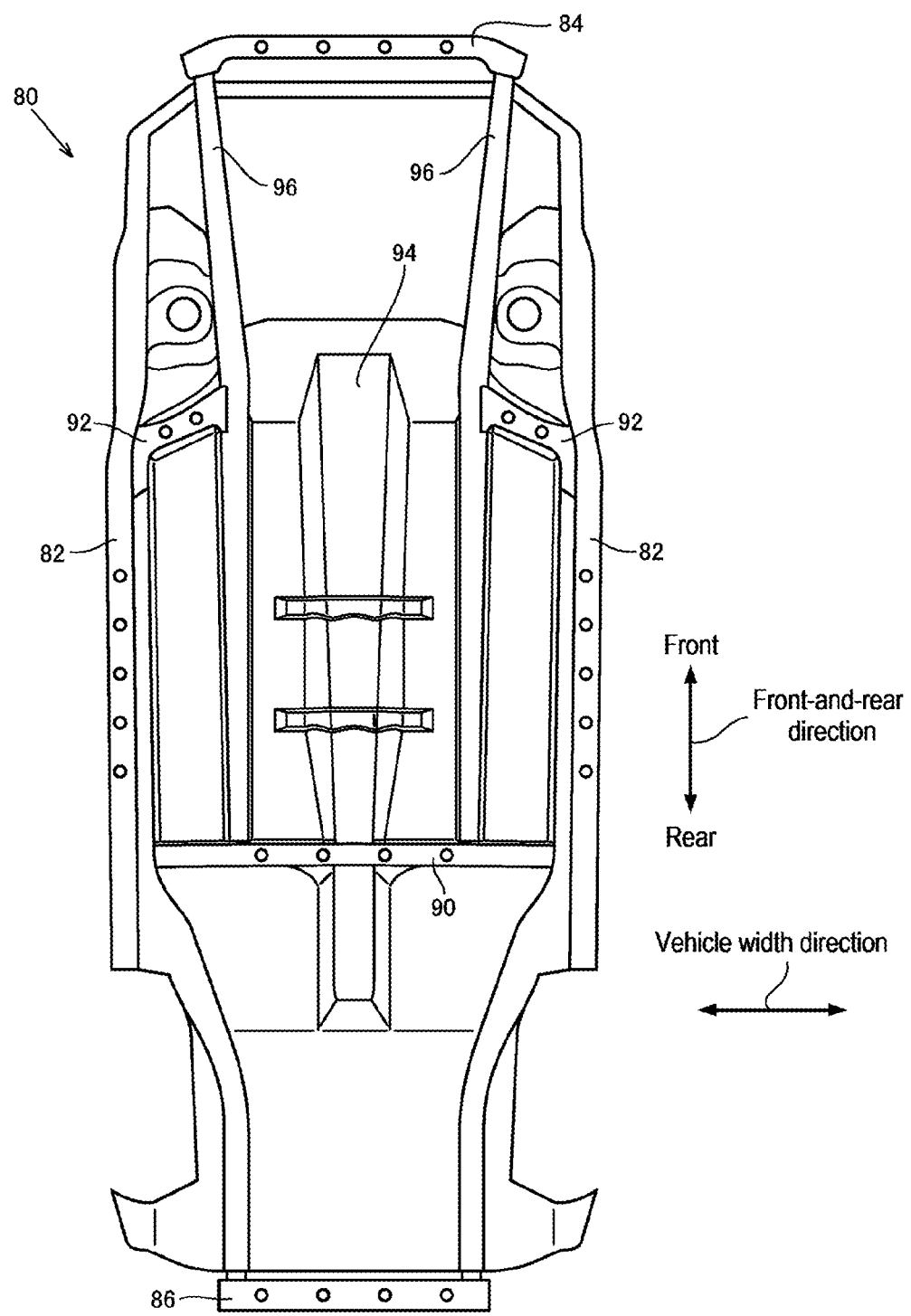

AUTOMOBILE STRUCTURAL MEMBER AND VEHICLE BODY

TECHNICAL FIELD

The present invention relates to an automobile structural member and a vehicle body that includes the automobile structural member.

BACKGROUND ART

The vehicle body of an automobile is required to adequately ensure the safety inside the cabin of the automobile even in a case where another automobile or the like collides with the automobile. Therefore, conventionally, various kinds of automobile structural members for ensuring safety inside the cabin of an automobile have been proposed (for example, see Patent Document 1).

Patent Document 1 discloses a center pillar which has a center pillar inner, a center pillar outer, and a patch member. The patch member is joined to the outer face of the center pillar outer.

Patent Document 1 discloses that by joining the patch member to the center pillar outer in a manner that satisfies predetermined requirements, the center pillar outer can be reinforced, and the energy absorption efficiency at the time of a collision can be improved.

LIST OF PRIOR ART DOCUMENTS

Patent Document

Patent Document 1: WO 2017/030191

SUMMARY OF INVENTION

Technical Problem

In this connection, in the automobile industry, from the viewpoint of improving fuel efficiency, there is a demand to further reduce the weight of automobile components. With respect to this point, in a case where a patch member is provided as disclosed in Patent Document 1, the problem arises that the weight of the center pillar increases.

Therefore, an objective of the present invention is to provide an automobile structural member which is light in weight and which has excellent strength with respect to collisions.

Solution to Problem

The gist of the present invention is an automobile structural member and a vehicle body that are described hereunder.

(1) An automobile structural member having a sheet-like first wall part, a sheet-like second wall part which faces the first wall part in a thickness direction of the first wall part, and a sheet-like third wall part which connects the first wall part and the second wall part,
wherein:
at least one of the first wall part and the second wall part has a sheet-like main wall part which has a longitudinal direction in a direction along a connecting part with the third wall part and has at least two through-holes formed so as to be aligned along the longitudinal direction, and at least two auxiliary wall parts which are provided so as to rise from the main wall part;
one of the two auxiliary wall parts is provided so as to rise in a thickness direction of the main wall part from an edge of one of the two through-holes, and the other of the two auxiliary wall parts is provided so as to rise in the thickness direction from an edge of the other of the two through-holes; and
a distance between the two auxiliary wall parts in the longitudinal direction is 1.4 times or less a width of the main wall part at a portion between the two auxiliary wall parts.

(2) The automobile structural member according to (1) above, wherein:
as seen from the thickness direction of the main wall part, at one side and the other side of the through-hole in the longitudinal direction, the auxiliary wall part intersects with a straight line that passes through a center of the through-hole and is parallel to the longitudinal direction.

(3) The automobile structural member according to (1) or (2) above, wherein:
the distance between the two auxiliary wall parts is 0.2 times or more the width of the main wall part at the portion between the two auxiliary wall parts.

(4) The automobile structural member according to any one of (1) to (3) above, wherein:
each of the first wall part and the second wall part has the main wall part and the at least two auxiliary wall parts.

(5) The automobile structural member according to (4) above, wherein:
the at least two auxiliary wall parts of the first wall part are provided so as to rise toward the second wall part side, and the at least two auxiliary wall parts of the second wall part are provided so as to rise toward the first wall part side.

(6) The automobile structural member according to any one of (1) to (5) above, wherein:
in the thickness direction of the main wall part, a distance between a front end of the auxiliary wall and the main wall part is 2.8 mm or more.

(7) The automobile structural member according to any one of (1) to (6) above, wherein:
each of the at least two auxiliary wall parts has a cylindrical shape.

(8) The automobile structural member according to any one of (1) to (7) above, wherein:
a length of the auxiliary wall in a width direction of the main wall part is within a range of 0.2 times to 1.0 times a width of the main wall part at a cross section which passes through a center of the through-hole and is perpendicular to the longitudinal direction.

(9) The automobile structural member according to any one of claims (1) to (6), wherein:
the auxiliary wall part includes at least two walls which are provided spaced apart from each other in a circumferential direction of the through-hole,
one of the two walls is provided on one side of the through-hole in the longitudinal direction, and the other of the two walls is provided on the other side of the through-hole in the longitudinal direction, and
a length of each of the two walls in a width direction of the main wall part is within a range of 0.2 times to 1.0 times a width of the main wall part at a cross section which passes through a center of the through-hole and which is perpendicular to the longitudinal direction.

(10) The automobile structural member according to any one of (1) to (9) above, wherein:
in a vehicle body, the first wall part and the second wall part face each other in a front-and-rear direction, and the longitudinal direction is closer to a vertical direction than a vehicle width direction and the front-and-rear direction.

(11) The automobile structural member according to (10) above, wherein:

the automobile structural member is a center pillar.

(12) The automobile structural member according to (11) above, wherein:

the at least two auxiliary wall parts are provided at positions that are lower than a center in the vertical direction.

(13) The automobile structural member according to any one of (1) to (9) above, wherein:

in a vehicle body, the first wall part and the second wall part face each other in a vertical direction, and the longitudinal direction is closer to a vehicle width direction or a front-and-rear direction than the vertical direction.

(14) The automobile structural member according to (13) above, wherein:

the automobile structural member is a side sill, a bumper beam, a cross member or a torque box.

(15) A vehicle body comprising the automobile structural member according to any one of claims 1 to 14.

Advantageous Effects of Invention

According to the present invention, an automobile structural member that is light in weight and has excellent strength with respect to a collision is obtained.

BRIEF DESCRIPTION OF DRAWINGS

FIG. 1 is a perspective view illustrating one example of an analysis model.

FIG. 2 is a view illustrating a cross section of the analysis model.

FIG. 3 is a multiple view drawing illustrating analysis models that are comparison objects.

FIG. 4 is a view showing analysis results.

FIG. 5 is a view that schematically illustrates deformation behavior in a case where an analysis model is caused to buckle.

FIG. 6 is a view showing analysis results.

FIG. 7 is a view showing analysis results.

FIG. 8 is a view showing analysis results.

FIG. 9 is a view showing analysis results.

FIG. 10 is a view showing analysis results.

FIG. 11 is a view showing analysis results.

FIG. 12 is a view showing analysis results.

FIG. 13 is a multiple view drawing including perspective views that illustrate another example of an analysis model.

FIG. 14 is a view illustrating an analysis model that is a comparison object.

FIG. 15 is a perspective view illustrating an automobile structural member according to one embodiment of the present invention.

FIG. 16 is a schematic cross-sectional view of a portion corresponding to a line A-A in FIG. 15.

FIG. 17 is a view in which a portion at which a through-hole is formed in a front wall part is seen from the inner side of a center pillar.

FIG. 18 is a view for describing a modification of a center pillar.

FIG. 19 is a view for describing another modification of a center pillar.

FIG. 20 is a view for describing a further modification of a center pillar.

FIG. 21 is a view for describing a further modification of a center pillar.

FIG. 22 is a view for describing a further modification of a center pillar.

FIG. 23 is a perspective view of an automobile structural member according to a second embodiment of the present invention.

FIG. 24 is a schematic cross-sectional view of a portion corresponding to a line A-A in FIG. 23.

FIG. 25 is a view in which a portion at which a through-hole is formed in a vertical wall part is seen from the inner side of the automobile structural member.

FIG. 26 is a view for describing a modification of the automobile structural member.

FIG. 27 is a view for describing another modification of the automobile structural member.

FIG. 28 is a view for describing a further modification of the automobile structural member.

FIG. 29 is a perspective view illustrating an automobile structural member according to a third embodiment of the present invention.

FIG. 30 is a perspective view illustrating an automobile structural member according to a fourth embodiment of the present invention.

FIG. 31 is a schematic cross-sectional view of a portion corresponding to a line B-B in FIG. 30.

FIG. 32 is a schematic perspective view illustrating one part of a vehicle body.

FIG. 33 is a schematic bottom view illustrating one part of a vehicle body.

DESCRIPTION OF EMBODIMENTS (Studies Conducted by the Present Inventors)

The present inventors conducted various studies in order to realize both an increase in strength and a reduction in weight of an automobile structural member in a compatible manner. As a result, the present inventors thought that, by performing burring on a cylindrical automobile structural member, the automobile structural member can be increased in strength and reduced in weight in a compatible manner. Therefore, the present inventors investigated the influence that burring has on the strength of an automobile structural member by numerical analysis (computer simulation) using a finite element method. Hereunder, the numerical analysis which the present inventors performed is described.

FIG. 1 is a perspective view illustrating one example of an analysis model of an automobile structural member which uses numerical analysis. FIG. 2 is a cross-sectional view of the analysis model that shows a portion corresponding to a line II-II in FIG. 1. Note that, in FIG. 1 and FIG. 2, arrows indicating an X-direction, a Y-direction and a Z-direction which are orthogonal to each other are shown.

As illustrated in FIG. 1, an analysis model 100 has a polygonal cylindrical shape that extends in the X-direction, and has four wall parts 102, 104, 106 and 108. The wall part 102 and the wall part 104 are provided so as to face each other in the Z-direction, and the wall part 106 and the wall part 108 are provided so as to face each other in the Y-direction. Note that, it is assumed that the analysis model 100 is formed by a steel sheet having a thickness of 0.8 mm and a tensile strength of 980 MPa-class. Further, the length of the analysis model 100 in the X-direction is 1000 mm, and the length in the Y-direction and the Z-direction is 100 mm, respectively.

As illustrated in FIG. 1 and FIG. 2, the wall part 102 has a sheet-like main wall part 102*b* in which a pair of through-holes 102*a* are formed, and a pair of auxiliary wall parts 102*c* which are provided for the pair of through-holes 102*a*, respectively. Similarly, the wall part 104 has a sheet-like main wall part 104b in which a pair of through-holes 104a are formed, and a pair of auxiliary wall parts 104c which are provided for the pair of through-holes 104a, respectively. It is assumed that the auxiliary wall parts 102c are formed by burring, and each auxiliary wall part 102c has a circular cylindrical shape and is formed so as to rise from the edge of the through-hole 102a toward the inner side of the analysis model 100. Similarly, it is assumed that the auxiliary wall parts 104c are formed by burring, and each auxiliary wall part 104c has a circular cylindrical shape and is formed so as to rise from the edge of the through-hole 104a toward the inner side of the analysis model 100.

Each of the pair of through-holes 102a is formed at the center in the Y-direction of the main wall part 102b. Similarly, each of the pair of through-holes 104a is formed at the center in the Y-direction of the main wall part 104b. The positions in the X-direction of the pair of through-holes 102a and the positions in the X-direction of the pair of through-holes 104a are equal to each other. An intermediate position in the X-direction between the pair of through-holes 102a coincides with the center of the wall part 102 in the X-direction, and an intermediate position in the X-direction between the pair of through-holes 104a coincides with the center of the wall part 104 in the X-direction. The diameter of each through-hole 102a and each through-hole 104a is 60 mm. Further, a distance W (shortest distance between the edge of one through-hole 102a and the edge of the other through-hole 102a) in the X-direction between the pair of through-holes 102a is 80 mm. Similarly, the distance in the X-direction between the pair of through-holes 104a is 80 mm.

Note that, hereinafter, the Y-direction is taken as the vertical direction. More specifically, the wall part 106 side in the Y-direction is taken as the upper side and the wall part 108 side in the Y-direction is taken as the lower side. As illustrated in FIG. 1, for the numerical analysis, three-point bending was performed by applying a load F to the wall part 106 in a state in which the wall part 108 was supported from underneath by a pair of support members 200 having an arc-shaped support surface. Note that, although diagrammatic representation is omitted to avoid complicating the drawings, for the three-point bending, the center in the X-direction of the wall part 106 was pressed downward by causing a pressing member having an arc-shaped pressing surface extending in the Z-direction to move in the downward direction. In the numerical analysis, the relation between the amount of displacement in the downward direction of the pressing member and the load F was investigated, and the deformation behavior in a case where the analysis model 100 was caused to buckle was also investigated.

Further, in addition to the analysis model 100 illustrated in FIG. 1, the present inventors also conducted a similar numerical analysis to the numerical analysis of the analysis model 100, using analysis models 100a, 100b and 100c serving as comparison objects (hereunder, also referred to as comparison models 100a, 100b and 100c) that are illustrated in FIG. 3, and investigated the relation between the amount of displacement in the downward direction of the pressing member and the load F. Note that, the comparison model 100a has a similar structure to the aforementioned analysis model 100 except that the comparison model 100a does not have the pair of through-holes 102a, the pair of through-holes 104a, the pair of auxiliary wall parts 102c and the pair of auxiliary wall parts 104c. The comparison model 100b has a similar structure to the aforementioned analysis model 100 except that the comparison model 100b does not have the pair of auxiliary wall parts 102c and the pair of auxiliary wall parts 104c. The comparison model 100c has a similar structure to the aforementioned analysis model 100 except that in the comparison model 100c the number of through-holes 102a, through-holes 104a, auxiliary wall parts 102c and auxiliary wall parts 104c is one, respectively. Note that, in the comparison model 100c, the through-hole 102a, the auxiliary wall part 102c, the through-hole 104a (not illustrated) and the auxiliary wall part 104c (not illustrated) are provided at the center in the X-direction of the comparison model 100c.

The analysis results are shown in FIG. 4. Note that, FIG. 4 shows analysis results in a case where a height h of the auxiliary wall parts 102c and 104c (see FIG. 2) of the analysis model 100 was set to 7.2 mm, respectively, and a radius of curvature R of a portion indicated by a broken-line circle in FIG. 2 was set to 0 mm. Note that, the phrase "height h of the auxiliary wall parts 102c and 104c" refers to the distance between the front end of the auxiliary wall parts 102c and 104c and the main wall parts 102b and 104b in the thickness direction of the main wall parts 102b and 104b, respectively. Note that, a case where the radius of curvature R of the portion indicated by the broken-line circle in FIG. 2 was set to 0 mm means a case where the internal surface of the main wall part 102b and the outer peripheral surface of the auxiliary wall part 102c intersect at a right angle and the internal surface of the main wall part 104b and the outer peripheral surface of the auxiliary wall part 104c intersect at a right angle.

Based on the results shown in FIG. 4, it was found that the analysis model 100 could receive a larger load than the comparison models 100a, 100b and 100c. In other words, it was found that, compared to the comparison models 100a, 100b and 100c, the analysis model 100 has excellent strength with respect to a load in the Y-direction.

FIG. 5 is a view that schematically illustrates deformation behavior in a case where the analysis model 100 was caused to buckle. Note that, in FIG. 5, the analysis model 100 before deformation is indicated by broken lines. Further, to avoid complicating the drawing, the through-holes and auxiliary wall parts are not illustrated in FIG. 5.

As illustrated in FIG. 5, according to the numerical analysis that the present inventors performed, each of the wall parts 102 and 104 buckled so as to become convex toward the outer side at a center part in the Y-direction (vertical direction). In other words, buckling of the wall surface occurred.

Based on the above results, it was found that, in an automobile structural member that is installed in a vehicle so that buckling of the wall surface occurs during a collision, the strength of the automobile structural member with respect to a collision can be improved by providing a plurality of auxiliary wall parts as described above in a wall part at which buckling occurs. It is considered that this is because, by forming a plurality of auxiliary wall parts in a wall part, the bending rigidity of the relevant wall part increases and it becomes difficult for the wall part to buckle.

Further, the present inventors also investigated what influence the height h (see FIG. 2) of the auxiliary wall parts 102c and 104c of the analysis model 100 has on the strength of the analysis model 100. Specifically, the present inventors set the height h of the auxiliary wall parts 102c and 104c to 3.0 mm, 4.0 mm and 7.2 mm, and performed numerical analysis under similar conditions as in the aforementioned analysis. The analysis results are shown in FIG. 6. Note that, for reference purposes, the analysis results for the comparison models 100a and 100b shown in FIG. 4 are also shown in FIG. 6.

Based on the results shown in FIG. 6, it was found that by setting the height h of the auxiliary wall parts 102c and 104c to preferably 3.0 mm or more, and more preferably 4.0 mm or more, a load in the Y-direction that the analysis model 100 can bear can be adequately increased.

Furthermore, the present inventors investigated the relation between the height h of the auxiliary wall parts 102c and 104c of the analysis model 100 and the maximum load in the Y-direction that the analysis model 100 can bear (maximum value of a load applied to the analysis model 100 when the aforementioned pressing member is moved 70 mm in the downward direction). For this investigation, in addition to the analysis model 100 having a thickness (sheet thickness of starting material) of 0.8 mm, an analysis was also performed using the analysis model 100 having a thickness of 0.4 mm. Note that, the distance W in the X-direction between the pair of through-holes 102a, and the distance in the X-direction between the pair of through-holes 104a was set to 60 mm. For the analysis model 100 having a thickness of 0.8 mm, the height h of the auxiliary wall parts 102c and 104c was set to 2.8 mm, 3.0 mm, 4.0 mm and 7.2 mm. Further, for the analysis model 100 having a thickness of 0.4 mm, the height h of the auxiliary wall parts 102c and 104c was set to 2.8 mm, 3.0 mm, 3.2 mm, 3.4 mm and 7.6 mm. Note that, similar conditions to the conditions of the aforementioned analysis were adopted with respect to conditions other than these analysis conditions.

FIG. 7 shows the analysis results for the analysis model 100 having a thickness of 0.8 mm, and FIG. 8 shows the analysis results for the analysis model 100 having a thickness of 0.4 mm. Note that, the maximum load ratio shown on the ordinate in FIG. 7 shows the ratio of the maximum load in the Y-direction that the analysis model 100 can bear with respect to the maximum load in the Y-direction that the comparison model 100a (thickness of 0.8 mm) can bear (maximum value of a load applied to the comparison model 100a when the aforementioned pressing member is moved 70 mm in the downward direction). Similarly, the maximum load ratio shown on the ordinate in FIG. 8 shows the ratio of the maximum load in the Y-direction that the analysis model 100 can bear with respect to the maximum load in the Y-direction that the comparison model 100a (thickness of 0.4 mm) can bear.

Based on the results shown in FIG. 7 and FIG. 8, it was found that the maximum load which the analysis model 100 can bear can be increased by raising the height h of the auxiliary wall parts 102c and 104c. Further, it was found that, regardless of the thickness of the analysis model 100, by appropriately setting the height h of the auxiliary wall parts 102c and 104c, the maximum load which the analysis model 100 can bear can be increased in comparison to the maximum load which the comparison model 100a (see FIG. 3) can bear.

The present inventors also investigated what influence the relation between the width (length in the Y-direction) of the main wall parts 102b and 102c and the length in the Y-direction of the auxiliary wall parts 102c and 104c has on the strength of the analysis model 100. In this investigation, the analysis model 100 having a thickness of 0.8 mm in which the height h of the auxiliary wall parts 102c and 104c was 7.2 mm was used, and analysis was performed under a condition in which a load was applied to the analysis model 100 in a similar manner to the aforementioned analysis. Note that, the length in the Y-direction of the auxiliary wall parts 102c and 104c was approximately equal to the diameter of the through-holes 102a and 104a. In the present investigation, the ratio of the diameter of the through-holes 102a and 104a with respect to the width (length in the Y-direction) of the main wall parts 102b and 104b was varied, and the manner in which the maximum load in the Y-direction that the analysis model 100 could bear changed was investigated. Note that, the distance between the centers of the pair of through-holes 102a in the X-direction and the distance between the centers of the pair of through-holes 104a in the X-direction were each set to 140 mm.

The analysis results are shown in FIG. 9. Note that, the maximum load ratio shown on the ordinate in FIG. 9 shows the ratio of the maximum load in the Y-direction which the analysis model 100 can bear with respect to the maximum load in the Y-direction which the comparison model 100a (thickness of 0.8 mm) can bear.

Based on the results shown in FIG. 9, it was found that, irrespective of the ratio of the diameter of the through-holes 102a and 104a with respect to the width of the main wall parts 102b and 104b, the maximum load which the analysis model 100 can bear can be increased in comparison to the maximum load which the comparison model 100a (see FIG. 3) can bear. Note that, based on the results illustrated in FIG. 9, it was found that the maximum load which the analysis model 100 can bear can be adequately increased by setting the ratio of the diameter of the through-holes 102a and 104a with respect to the width of the main wall parts 102b and 104b within the range of 0.3 or more to 1.0 or less. In other words, it is preferable to set ratio of the length in the Y-direction of the auxiliary wall parts 102c and 104c with respect to the width of the main wall parts 102b and 104b (length in the Y-direction) within the range of 0.2 to 1.0, and more preferably within the range of 0.3 to 1.0.

In consideration of the aforementioned results, the present inventors also investigated the influence that the relation between the width of the main wall part (length in the Y-direction) and the distance between the auxiliary wall parts has on the strength of the analysis model 100. In this investigation, the analysis model 100 having a thickness of 0.8 mm in which the height h of the auxiliary wall parts 102c and 104c was 7.2 mm, and the analysis model 100 having a thickness of 0.4 mm in which the height h of the auxiliary wall parts 102c and 104c was 7.2 mm were used, and analysis was performed under a condition in which a load was applied to each analysis model 100 in a similar manner to the aforementioned analysis. Note that, the distance between the pair of auxiliary wall parts 102c was approximately equal to the distance W between the pair of through-holes 102a, and the distance between the pair of auxiliary wall parts 104c was approximately equal to the distance between the pair of through-holes 104a. In the present investigation, the ratio of the distance between the pair of through-holes with respect to the width of the main wall part was varied, and the manner in which the maximum load in the Y-direction that the analysis model 100 could bear changed was investigated. Note that, the diameter of the through-holes 102a and 104a was set to 60 mm. Further, in the analysis model 100 having a thickness of 0.8 mm, the ratio of the distance between the pair of through-holes with respect to the width of the main wall part was set to 0.2, 0.4, 0.5, 0.6, 0.8, 1.0, 1.2, 1.4, 1.5 and 1.6. In the analysis model 100 having a thickness of 0.4 mm, the ratio of the distance between the pair of through-holes with respect to the width of the main wall part was set to 0.2, 0.4, 0.6, 0.8, 1.0, 1.2, 1.4, 1.5 and 1.6.

The analysis results for the analysis model 100 having a thickness of 0.8 mm are shown in FIG. 10, and the analysis results for the analysis model 100 having a thickness of 0.4 mm are shown in FIG. 11. Note that, the maximum load ratio shown on the ordinate in FIG. 10 shows the ratio of the maximum load in the Y-direction which the analysis model 100 can bear with respect to the maximum load in the Y-direction which the comparison model 100a (thickness 0.8 mm) can bear. Similarly, the maximum load ratio shown on the ordinate in FIG. 11 shows the ratio of the maximum load in the Y-direction which the analysis model 100 can bear with respect to the maximum load in the Y-direction which the comparison model 100a (thickness 0.4 mm) can bear.

Based on the results illustrated in FIG. 10 and FIG. 11, it was found that, irrespective of the thickness of the analysis model 100, by setting the ratio of the distance between the pair of through-holes with respect to the width of the main wall part to 1.4 or less, the maximum load which the analysis model 100 can bear can be increased in comparison to the maximum load which the comparison model 100a (see FIG. 3) can bear. In other words, it was found that by setting the ratio of the distance between the pair of auxiliary wall parts with respect to the width of the main wall part to 1.4 or less, the maximum load which the analysis model 100 can bear can be adequately increased. Further, based on the results illustrated in FIG. 10 and FIG. 11, it was found that the ratio of the distance between the pair of auxiliary wall parts with respect to the width of the main wall part is preferably set to 0.2 or more.

The present inventors also investigated what influence the shape of a boundary part between the main wall part 102b and the auxiliary wall part 102c, and the shape of a boundary part between the main wall part 104b and the auxiliary wall part 104c have on the strength of the analysis model 100. Specifically, the radius of curvature R of the portion indicated by a broken-line circle in FIG. 2 was set to 0 mm, 1 mm and 2 mm, and analysis was performed using similar conditions as the analysis described above with regard to FIG. 4. The analysis results are shown in FIG. 12. Note that, for reference purposes, the analysis result for the comparison model 100a shown in FIG. 4 are also shown in FIG. 12.

Based on the results shown in FIG. 12, it was found that the shape of the boundary part between the main wall part 102b and the auxiliary wall part 102c and the shape of the boundary part between the main wall part 104b and the auxiliary wall part 104c have almost no influence on the strength of the analysis model 100 with respect to a load in the Y-direction.

In addition, using an analysis model 110 illustrated in FIG. 13 and a comparison model 110a illustrated in FIG. 14, the present inventors performed a numerical analysis using similar conditions as the analysis described above with regard to FIG. 4, and investigated the relation between the amount of displacement in the downward direction of the pressing member and the load. Note that, in FIG. 13, (a) is a perspective view illustrating the analysis model 110, and (b) is a cross-sectional view of the analysis model 110 at a portion corresponding to a line b-b in (a). The analysis model 110 has a similar structure to the aforementioned analysis model 100 except that the analysis model 110 does not have the wall part 108 (see FIG. 1). Note that, the height h (see FIG. 13(b)) of each of the auxiliary wall parts 102c and 104c was set to 7.2 mm. The comparison model 110a has a similar structure to the aforementioned analysis model 110 except that the comparison model 110a does not have the pair of through-holes 102a, the pair of through-holes 104a, the pair of auxiliary wall parts 102c and the pair of auxiliary wall parts 104c.

The result of the numerical analysis indicated that the maximum load which the analysis model 110 can bear was 1.45 kN. On the other hand, the maximum load which the comparison model 110a can bear was 1.25 kN. Based on this result, it was found that, not only in a cylindrical automobile structural member, but in an automobile structural member having a cross-sectional U shape also, the strength can be enhanced by providing a plurality of auxiliary wall parts in wall parts that extend approximately parallel to the direction of the load, respectively.

The present invention was made based on the findings described above.

DESCRIPTION OF EMBODIMENTS OF PRESENT INVENTION

Although the details will be described later, an automobile structural member according to the present invention has: a sheet-like first wall part; a sheet-like second wall part that faces the first wall part in a thickness direction of the first wall part; and a sheet-like third wall part that connects the first wall part and the second wall part. At least one of the first wall part and the second wall part has: a sheet-like main wall part in which a direction along a connecting part with the third wall part (extending direction of the connecting part) is the longitudinal direction, and in which at least two through-holes are formed so as to be aligned along the longitudinal direction; and at least two auxiliary wall parts which are provided so as to rise from the main wall part. One of the two auxiliary wall parts is provided so as to rise in the thickness direction of the main wall part from an edge of one of the two through-holes, and the other of the two auxiliary wall parts is provided so as to rise in the thickness direction of the main wall part from an edge of the other of the two through-holes. A distance between the two auxiliary wall parts in the longitudinal direction of the main wall part is 1.4 times or less the width of the main wall part at a portion between the two auxiliary wall parts. Note that, in the automobile structural member according to the present invention, preferably the shortest distance between two auxiliary wall parts is set to 1.4 times or less the width of the main wall part at a portion between the two auxiliary wall parts. Hereinafter, the automobile structural member according to an embodiment of the present invention is described in detail. Note that, in the present description, the configuration of each part of the automobile structural member is described using a vertical direction, a vehicle width direction and a front-and-rear direction with respect to a case where a state in which the automobile structural member is used as a constituent member of the vehicle body of an automobile while it is stopped on a horizontal plane is defined as a reference.

The automobile structural member according to the embodiment of the present invention is formed using, for example, a starting material (sheet material) having a thickness within a range of 0.4 mm to 4.0 mm and a tensile strength of 980 MPa-class or more. Specifically, a metal such as steel or aluminum, carbon fiber reinforced plastic (CFRP), or resin or the like can be used as the starting material of the automobile structural member. Note that, the present invention is preferably utilized for an automobile structural member that uses a starting material having a thickness within the range of 0.4 to 2.0 mm. Further, although the present invention is preferably utilized for an automobile structural member that uses a starting material having a tensile strength of 980 MPa or more, the present invention can also be utilized for an automobile structural member that uses a starting material having a tensile strength of less than 980 MPa. Note that, the tensile strength of a starting material can be measured by taking a tensile test specimen conforming to JIS Z 2201 from the starting material, and performing a tensile test in accordance with JIS Z 2241.

First Embodiment

An automobile structural member according to a first embodiment of the present invention is, when used as a constituent member of a vehicle body, a member in which a first wall part and a second wall part face each other in the front-and-rear direction. Further, the automobile structural member according to the first embodiment is, for example, when used as a constituent member of a vehicle body, a member in which a longitudinal direction of a main wall part to be described later is closer to the vertical direction than the vehicle width direction and the front-and-rear direction. Note that, the phrase "the longitudinal direction is closer to the vertical direction than the vehicle width direction and the front-and-rear direction" means that an angle (acute angle) formed by the longitudinal direction and the vertical direction is less than 45°.

FIG. 15 is a perspective view illustrating the automobile structural member according to the first embodiment of the present invention. As illustrated in FIG. 15, an automobile structural member 10 according to the present embodiment is a center pillar. In the following description of the first embodiment, the automobile structural member 10 according to the present embodiment is described as "center pillar 10". FIG. 16 is a view illustrating a schematic cross-section (cross section perpendicular to the vertical direction) of a portion corresponding to a line A-A in FIG. 15.

As illustrated in FIG. 15 and FIG. 16, the center pillar 10 according to the present embodiment is formed extending along the vertical direction and in a cylindrical shape. As described in detail later, the center pillar 10 includes a sheet-like front wall part 12, a sheet-like rear wall part 14 (see FIG. 16) that faces the front wall part 12 in the thickness direction of the front wall part 12, a side wall part 16 that connects the front wall part 12 and the rear wall part 14, and a side wall part 18 (see FIG. 16) that connects the front wall part 12 and the rear wall part 14. In the present embodiment, the front wall part 12 and the rear wall part 14 face each other in the front-and-rear direction (front-and-rear direction of the vehicle body), and the side wall part 16 and the side wall part 18 face each other in the vehicle width direction. In the present embodiment, the front wall part 12 corresponds to the first wall part, the rear wall part 14 corresponds to the second wall part, and the side wall part 16 corresponds to the third wall part.

In the present embodiment, the front wall part 12, the rear wall part 14, the side wall part 16 and the side wall part 18 each have a long-length shape, and are formed so as to extend in the vertical direction. The side wall part 16 is formed so as to connect an edge part on one side (outer side) in the vehicle width direction of the front wall part 12 and an edge part on one side (outer side) in the vehicle width direction of the rear wall part 14. The side wall part 18 is formed so as to connect an edge part on the other side (inner side) in the vehicle width direction of the front wall part 12 and an edge part on the other side (inner side) in the vehicle width direction of the rear wall part 14.

Note that, in the present embodiment, the center pillar 10 has a first member 10a which has a hat-shaped cross-sectional shape, and a sheet-like second member 10b. In the present embodiment, the first member 10a is a center pillar outer, and the second member 10b is a center pillar inner 10b. In the following description of the first embodiment, the first member 10a is described as a "center pillar outer 10a", and the second member 10b is described as a "center pillar inner 10b". The center pillar outer 10a and the center pillar inner 10b are welded to each other. In the present embodiment, the center pillar outer 10a has a hat-shaped cross-sectional shape, and has a pair of vertical wall parts (the front wall part 12 and the rear wall part 14), a top plate part (the side wall part 16), and a pair of flange parts 20 and 22. In the present embodiment, the flange parts 20 and 22 and the center pillar inner 10b are welded to each other. By this means, the front wall part 12 and the rear wall part 14 are connected through the flange parts 20 and 22 and the center pillar inner 10b. In other words, in the present embodiment, the side wall part 18 that connects the front wall part 12 and the rear wall part 14 is formed by the flange parts 20 and 22 and the center pillar inner 10b.

Note that, the configuration of a center pillar to which the present invention can be applied is not limited to the configuration described above. The present invention can be applied to center pillars of various shapes that have a front wall part and a rear wall part which face each other in the front-and-rear direction of the vehicle body, and a pair of side wall parts which face each other in the vehicle width direction. Accordingly, a detailed description of the entire configuration of the center pillar 10 is omitted here. Note that, in the present description, a state in which the internal surface of the first wall part faces the second wall part side, and the internal surface of the second wall part faces the first wall part side is defined as a state in which the first wall part and the second wall part face each other in the thickness direction of the first wall part. Further, in the present embodiment, a state in which the internal surface of the front wall part faces rearward, and the internal surface of the rear wall part faces frontward is defined as a state in which the front wall part and the rear wall part face each other in the front-and-rear direction of the vehicle body. Accordingly, although the front wall part 12 and the rear wall part 14 illustrated in FIG. 16 are not parallel to each other, the front wall part 12 and the rear wall part 14 face each other in the front-and-rear direction of the vehicle body. Furthermore, in the present description, a state in which the internal surface of a side wall part on one side in the vehicle width direction faces the other side in the vehicle width direction, and the internal surface of a side wall part on the other side in the vehicle width direction faces the one side in the vehicle width direction is defined as a state in which the pair of side wall parts face each other in the vehicle width direction.

As illustrated in FIG. 15 and FIG. 16, the front wall part 12 has a sheet-like main wall part 12b in which a plurality of through-holes 12a are formed, and a plurality of auxiliary wall parts 12c which are provided for the plurality of through-holes 12a, respectively. In the present embodiment, a direction along a connecting part 17a between the main wall part 12b and the side wall part 16 is the longitudinal direction of the main wall part 12b. The plurality of through-holes 12a are formed so as to be aligned along the longitudinal direction of the main wall part 12b. In the present embodiment, four through-holes 12a and four auxiliary wall parts 12c are formed. The auxiliary wall part 12c can be formed, for example, by a known burring method. The same applies with respect to an auxiliary wall part 14c to be described later.

The plurality of auxiliary wall parts 12c are each provided so as to rise toward the rear wall part 14 side from the edge of the corresponding through-hole 12a. In other words, the plurality of auxiliary wall parts 12c are each provided so as to rise in the rearward direction. Referring to FIG. 16, in the thickness direction of the main wall part 12b, a distance H1 between the front end of each auxiliary wall part 12c and the main wall part 12b is preferably 2.8 mm or more, more preferably is 3.0 mm or more, and further preferably is 4.0 mm or more.

As illustrated in FIG. 16, the rear wall part 14 has a sheet-like main wall part 14b in which a plurality of through-holes 14a (in FIG. 16, only one through-hole 14a is illustrated) are formed, and a plurality of auxiliary wall parts 14c provided for the plurality of through-holes 14a, respectively. In the present embodiment, a direction along a connecting part 17b between the main wall part 14b and the side wall part 16 is the longitudinal direction of the main wall part 14b. The plurality of through-holes 14a are formed so as to be aligned along the longitudinal direction of the main wall part 14b. In the present embodiment, for example, four through-holes 14a and four auxiliary wall parts 14c are formed.

The plurality of auxiliary wall parts 14c are each provided so as to rise toward the front wall part 12 side from the edge of the corresponding through-hole 14a. In other words, the plurality of auxiliary wall parts 14c are each provided so as to rise in the frontward direction. In the thickness direction of the main wall part 14b, a distance H2 between the front end of each auxiliary wall part 14c and the main wall part 14b is preferably 2.8 mm or more, more preferably is 3.0 mm or more, and further preferably is 4.0 mm or more.

In the present embodiment, as seen from the thickness direction of the main wall part 12b, a direction perpendicular to the longitudinal direction of the main wall part 12b (direction perpendicular to the extending direction of the connecting part 17a) is taken as the width direction of the main wall part 12b. The width (length in the width direction) of the main wall part 12b is, for example, set within a range of 50 mm to 200 mm. Further, in the present embodiment, as seen from the thickness direction of the main wall part 14b, a direction perpendicular to the longitudinal direction of the main wall part 14b (direction perpendicular to the extending direction of the connecting part 17b) is taken as the width direction of the main wall part 14b. The width (length in the width direction) of the main wall part 14b is, for example, set within a range of 50 mm to 200 mm.

Referring to FIG. 15, if the auxiliary wall parts 12c are spaced too far apart from each other, there is a risk that, when crushing occurs, the main wall part 12b will buckle at a portion located between adjacent auxiliary wall parts 12c. In other words, buckling of the main wall part 12b can be effectively suppressed by providing the auxiliary wall parts 12c at positions that are moderately close to each other. Therefore, in the present embodiment, the distance (distance in the longitudinal direction of the main wall part 12b) between two auxiliary wall parts 12c that are adjacent is set so as to be 1.4 times or less the width of the main wall part 12b at the portion between the relevant two auxiliary wall parts 12c. Similarly, the distance (distance in the longitudinal direction of the main wall part 14b) between two auxiliary wall parts 14c that are adjacent is set so as to be 1.4 times or less the width of the main wall part 14b at the portion between the relevant two auxiliary wall parts 14c.

Note that, preferably the shortest distance between two auxiliary wall parts 12c is set so as to be 1.4 times or less the width of the main wall part 12b at the portion between the two auxiliary wall parts 12c, and the shortest distance between two auxiliary wall parts 14c is set so as to be 1.4 times or less the width of the main wall part 14b at the portion between the two auxiliary wall parts 14c.

In the present embodiment, the distance between two auxiliary wall parts is determined by taking the base (boundary part with respect to the main wall part) of the respective auxiliary wall parts as a reference. Accordingly, as illustrated in FIG. 18 to be described later, even in a case where auxiliary wall parts incline with respect to the main wall part, the phrase "distance between two auxiliary wall parts" means the distance between the bases of the two auxiliary wall parts, and not the distance between the front ends of the two auxiliary wall parts.

Note that, in the present embodiment, the distance between two through-holes 12a that are adjacent (distance in the longitudinal direction of the main wall part 12b) is also similarly set so as to be 1.4 times or less the width of the main wall part 12b at the portion between the relevant two through-holes 12a. Further, the distance between two through-holes 14a that are adjacent (distance in the longitudinal direction of the main wall part 14b) is also similarly set so as to be 1.4 times or less the width of the main wall part 14b at the portion between the relevant two through-holes 14a.

Note that, if the distance between two auxiliary wall parts (through-holes) that are adjacent is too short, there is a risk that forming of the automobile structural member will become difficult. Therefore, in the present embodiment, the distance in the aforementioned longitudinal direction between two auxiliary wall parts 12c that are adjacent is preferably set so as to be 0.2 times or more the width of the main wall part 12b at a portion between the relevant two auxiliary wall parts 12c, and more preferably is set so as to be 0.4 times or more the aforementioned width, and further preferably is set so as to be 0.6 times or more the aforementioned width. Similarly, the distance in the aforementioned longitudinal direction between two auxiliary wall parts 14c that are adjacent is also preferably set so as to be 0.2 times or more the width of the main wall part 14b at a portion between the relevant two auxiliary wall parts 14c, and more preferably is set so as to be 0.4 times or more the aforementioned width, and further preferably is set so as to be 0.6 times or more the aforementioned width. Further, the distance in the aforementioned longitudinal direction between two through-holes 12a that are adjacent is preferably set so as to be 0.2 times or more the width of the main wall part 12b at a portion between the relevant two through-holes 12a, and more preferably is set so as to be 0.4 times or more the aforementioned width, and further preferably is set so as to be 0.6 times or more the aforementioned width. Similarly, the distance in the aforementioned longitudinal direction between two through-holes 14a that are adjacent is also preferably set so as to be 0.2 times or more the width of the main wall part 14b at a portion between the relevant two through-holes 14a, and more preferably is set so as to be 0.4 times or more the aforementioned width, and further preferably is set so as to be 0.6 times or more the aforementioned width.

Note that, in a case where the width of a main wall part at a portion between two auxiliary wall parts (through-holes) is not constant, the phrase "width of the main wall part at a portion between the two auxiliary wall parts (through-holes)" means the largest value of the width of the main wall part at the portion between the two auxiliary wall parts (through-holes). However, the distance between two auxiliary wall parts (through-holes) that are adjacent (distance in the longitudinal direction of the main wall part or shortest distance) may be set so as to be 1.4 times or less the smallest value of the width of the main wall part at the portion between the relevant two auxiliary wall parts (through-holes), or may be set so as to be 0.2 times or more the smallest value of the width of the main wall part at the portion between the relevant two auxiliary wall parts (through-holes).

In the present embodiment, the plurality of auxiliary wall parts 12c and the plurality of auxiliary wall parts 14c are provided at positions that are lower than the center of the center pillar 10 in the vertical direction.

Note that, the number of the through-holes 12a and the auxiliary wall parts 12c is not limited to four, respectively, and may be two or three, or may be five or more. The same applies with respect to the through-holes 14a and the auxiliary wall parts 14c.

FIG. 17 is a view illustrating a portion at which the through-hole 12a is formed in the front wall part 12 as seen from the inner side of the center pillar 10. Note that, in FIG. 17, an imaginary straight line L which, as seen from the thickness direction of the main wall part 12b, passes through the center of the through-hole 12a and is parallel to the longitudinal direction of the main wall part 12b is indicated by a dashed line. As illustrated in FIG. 17, in the present embodiment, as seen from the thickness direction of the main wall part 12b, the auxiliary wall part 12c is provided so as to intersect with the straight line L on one side and the other side of the through-hole 12a in the longitudinal direction of the main wall part 12b. Although diagrammatic representation is omitted from the drawings, the auxiliary wall part 14c is also similarly provided so as to intersect with a straight line (imaginary line) which, as seen from the thickness direction of the main wall part 14b, passes through the center of the through-hole 14a and is parallel to the longitudinal direction of the main wall part 14b, on one side and the other side of the through-hole 14a in the longitudinal direction of the main wall part 14b. In the present embodiment, each through-hole 12a has a circular shape, and each auxiliary wall part 12c has a cylindrical shape (in the present embodiment, a circular cylindrical shape). Similarly, in the present embodiment, each through-hole 14a has a circular shape, and each auxiliary wall part 14c has a cylindrical shape (in the present embodiment, a circular cylindrical shape).

Referring to FIG. 16, the length of the auxiliary wall part 12c in the width direction of the main wall part 12b is preferably 0.2 times or more the width of the main wall part 12b at a cross section which passes through the center of the through-hole 12a corresponding to the relevant auxiliary wall part 12c and which is perpendicular to the longitudinal direction of the main wall part 12b, and more preferably is 0.3 times or more the width of the main wall part 12b at the aforementioned cross section. Further, the length of the auxiliary wall part 12c in the width direction of the main wall part 12b is preferably 1.0 times or less the width of the main wall part 12b at a cross section which passes through the center of the through-hole 12a corresponding to the relevant auxiliary wall part 12c and which is perpendicular to the longitudinal direction of the main wall part 12b, and more preferably is 0.9 times or less the width of the main wall part 12b at the aforementioned cross section.

Similarly, the length of the auxiliary wall part 14c in the width direction of the main wall part 14b is preferably 0.2 times or more the width of the main wall part 14b at a cross section which passes through the center of the through-hole 14a corresponding to the relevant auxiliary wall part 14c and which is perpendicular to the longitudinal direction of the main wall part 14b, and more preferably is 0.3 times or more the width of the main wall part 14b at the aforementioned cross section. Further, the length of the auxiliary wall part 14c in the width direction of the main wall part 14b is preferably 1.0 times or less the width of the main wall part 14b at a cross section which passes through the center of the through-hole 14a corresponding to the relevant auxiliary wall part 14c and which is perpendicular to the longitudinal direction of the main wall part 14b, and more preferably is 0.9 times or less the width of the main wall part 14b at the aforementioned cross section.

Note that, in the present embodiment, at a cross section of the center pillar 10 that passes through the center of the through-hole 12a and is perpendicular to the longitudinal direction of the main wall part 12b, the respective lengths of the through-hole 12a and the auxiliary wall part 12c in the width direction of the main wall part 12b are set to, for example, a size that is 0.4 to 0.7 times the width of the main wall part 12b. Similarly, at a cross section of the center pillar 10 that passes through the center of the through-hole 14a and is perpendicular to the longitudinal direction of the main wall part 14b, the respective lengths of the through-hole 14a and the auxiliary wall part 14c in the width direction of the main wall part 14b are set to, for example, a size that is 0.4 to 0.7 times the width of the main wall part 14b.

Note that, at the cross section illustrated in FIG. 16, if the length (length in the width direction of the main wall parts 12b and 14b) of the through-holes 12a and 14a is too small, the length (length in the width direction of the main wall parts 12b and 14b) of the auxiliary wall parts 12c and 14c will also become smaller, and there is a risk that the buckling suppression effect will decrease. In order to definitely prevent such a decrease in the buckling suppression effect, in the present embodiment, as described above, the respective lengths of the through-holes 12a and 14a and the auxiliary wall parts 12c and 14c are set to, for example, 0.4 times or more the respective widths of the corresponding main wall parts 12b and 14b. On the other hand, if the length of the through-holes 12a and 14a is too large, the regions which receive a load in the main wall parts 12b and 14b will be reduced, and there is a risk that the buckling suppression effect will decrease. In order to definitely prevent such a decrease in the buckling suppression effect, in the present embodiment, as described above, the respective lengths of the through-holes 12a and 14a and of the auxiliary wall parts 12c and 14c are set to, for example, 0.7 times or less the respective widths of the corresponding main wall parts 12b and 14b.

Advantageous Effects of Present Embodiment

In the center pillar 10 according to the present embodiment, a plurality of the auxiliary wall parts 12c are formed in the front wall part 12, and a plurality of the auxiliary wall parts 14c are formed in the rear wall part 14. By this means, the strength of the center pillar 10 with respect to a load in the vehicle width direction can be enhanced. Therefore, for example, even in a case in which another automobile or the like collides with a side face of an automobile equipped with the center pillar 10, a load can be adequately received by the center pillar 10, and the collision energy can be adequately absorbed. By this means, the safety inside the cabin at the time of a side impact can be improved. Further, in the present embodiment, since a plurality of the through-holes 12a are formed in the front wall part 12 and a plurality of the through-holes 14a are formed in the rear wall part 14, the weight of the center pillar 10 can be reduced. Thus, according to the present embodiment, the center pillar 10 (automobile structural member) which is light in weight and which has excellent strength with respect to a side impact is obtained.

Further, in the present embodiment, the plurality of auxiliary wall parts 12c and the plurality of auxiliary wall parts 14c are provided at positions that are lower than the center of the center pillar 10 in the vertical direction. By this means, in a case where another automobile or the like collides with the lower part of the center pillar 10 from the outer side in the vehicle width direction, the collision energy can be adequately absorbed. By this means, the safety inside the cabin at the time of a side impact can be improved.

(Modification)

Although in the foregoing embodiment a case was described in which the auxiliary wall part 12c rises perpendicularly with respect to the main wall part 12b, as illustrated in FIG. 18, the auxiliary wall part 12c may incline with respect to the main wall part 12b. The same applies with respect to the auxiliary wall part 14c. In this case also, in the thickness direction of the main wall part 12b, the distance H1 between the front end of the auxiliary wall part 12c and the main wall part 12b is preferably 2.8 mm or more, more preferably is 3.0 mm or more, and further preferably is 4.0 mm or more. Further, in the thickness direction of the main wall part 14b, the distance H2 between the front end of the auxiliary wall part 14c and the main wall part 14b is preferably 2.8 mm or more, more preferably is 3.0 mm or more, and further preferably is 4.0 mm or more. Note that, although in the example illustrated in FIG. 18 the auxiliary wall part 12c is formed so that the diameter decreases progressively toward the front end side (center side of the center pillar 10), the auxiliary wall part 12c may be formed so that the diameter increases progressively toward the front end side. The same applies with respect to the auxiliary wall part 14c.

Note that, the closer an angle $\theta_1$ that the main wall part 12b and the auxiliary wall part 12c form is to 90°, the higher the bending rigidity of the front wall part 12 will be. On the other hand, in a case where the angle $\theta_1$ that the main wall part 12b and the auxiliary wall part 12c form is large and in a case where the angle $\theta_1$ is small, the bending rigidity of the front wall part 12 decreases. Therefore, to adequately exert the advantageous effect of improving the bending rigidity that is produced by the auxiliary wall part 12c, the angle $\theta_1$ that the main wall part 12b and the auxiliary wall part 12c form is preferably set within the range of 50 to 130°, more preferably is set within the range of 70 to 110°, and further preferably is set within the range of 80 to 100°. Similarly, an angle $\theta_2$ that the main wall part 14b and the auxiliary wall part 14c form is preferably set within the range of 50 to 130°, more preferably is set within the range of 70 to 110°, and further preferably is set within the range of 80 to 100°. Note that, in the present description, the phrase "angle that the main wall part and the auxiliary wall part form" means an angle that the main wall part and the auxiliary wall part form at a cross section that passes through the center of the through-hole and perpendicular to the longitudinal direction of the main wall part. Accordingly, the angle $\theta_1$ in the present embodiment is an angle that the main wall part 12b and the auxiliary wall part 12c form at a cross section that passes through the center of the through-hole 12a and perpendicular to the longitudinal direction of the main wall part 12b. Similarly, the angle $\theta_2$ in the present embodiment is an angle that the main wall part 14b and the auxiliary wall part 14c form at a cross section that passes through the center of the through-hole 14a and perpendicular to the longitudinal direction of the main wall part 14b.

Although in the foregoing embodiment a case is described in which the through-hole 12a has a circular shape and the auxiliary wall part 12c has a circular cylindrical shape, the shapes of the through-hole 12a and the auxiliary wall part 12c are not limited to the shapes described in the aforementioned example. For example, as illustrated in FIG. 19, the through-hole 12a may have a polygonal shape (in FIG. 19, a rectangular shape), and the auxiliary wall part 12c may have a polygonal cylindrical shape. Although a detailed description is omitted here, the same also applies with respect to the through-hole 14a and the auxiliary wall part 14c.

Although in the foregoing embodiment the auxiliary wall parts 12c and 14c which have a cylindrical shape are described, the shape of the auxiliary wall parts 12c and 14c is not limited to a cylindrical shape. However, each of the auxiliary wall parts is preferably provided so that, as seen from the thickness direction of the main wall part, on one side and the other side of the corresponding through-hole in the longitudinal direction of the main wall part, the auxiliary wall part intersects with a straight line (imaginary line) that passes through the center of the through-hole and is parallel to the longitudinal direction of the main wall part. In the present embodiment, it suffices that the auxiliary wall part 12c is formed so as to extend in the vehicle width direction at least at the upper end and lower end of the through-hole 12a. Accordingly, as illustrated in FIG. 20, the auxiliary wall part 12c may be composed of a plurality of walls 12d and 12e that are formed so as to be spaced apart from each other in the circumferential direction of the through-hole 12a.

Note that, in the example illustrated in FIG. 20, the wall 12d is provided on one side of the through-hole 12a in the longitudinal direction of the main wall part 12b, and the wall 12e is provided on the other side of the through-hole 12a in the aforementioned longitudinal direction. The walls 12d and 12e are each provided so that, as seen from the thickness direction of the main wall part 12b, the walls 12d and 12e each intersect with a straight line L that passes through the center of the through-hole 12a and is parallel to the longitudinal direction of the main wall part 12b. In other words, the wall 12d is formed along the edge of the through-hole 12a so as to extend in the vehicle width direction along the upper end of the through-hole 12a, and the wall 12e is formed along the edge of the through-hole 12a so as to extend in the vehicle width direction along the lower end of the through-hole 12a. In the present embodiment, an angle that the wall 12d and the main wall part 12b form, and an angle that the wall 12e and the main wall part 12b form are each preferably set within the range of 50 to 130°, more preferably are each set within the range of 70 to 110°, and further preferably are each set within the range of 80 to 100°. Although a detailed description is omitted here, the auxiliary wall part 14c may also be composed of a plurality of walls, similarly to the auxiliary wall part 12c. Note that, in the present embodiment, the length of each of the walls in the width direction of the main wall part is preferably within the range of 0.2 times or more to 1.0 times or less the width of the main wall part at a cross section which passes through the center of the through-hole corresponding to the relevant wall and which is perpendicular to the longitudinal direction of the main wall part, and more preferably is within the range of 0.3 times or more to 0.9 times or less the width of the main wall part at the aforementioned cross section. The length of each of the walls in the width direction of the main wall part is, for example, set to a size that is within the range of 0.4 to 0.7 times the width of the main wall part at a cross section which passes through the center of the through-hole corresponding to the relevant wall and which is perpendicular to the longitudinal direction of the main wall part. The same also applies with respect to embodiments that are described later.

Further, although a detailed description is omitted here, even in a case where the through-hole 12a is a polygonal shape as illustrated in FIG. 19, the auxiliary wall part 12c may be composed of a plurality of walls. In this case, for example, as seen from the thickness direction of the main wall part 12b, two walls among the plurality of walls are provided so as to intersect with a straight line L which passes through the center of the through-hole 12a and which is parallel to the longitudinal direction of the main wall part 12b. Further, although diagrammatic representation is omitted here, in a case where the through-hole 14a is a polygonal shape also, the auxiliary wall part 14c may be similarly composed of a plurality of walls.

Although in the foregoing embodiment a case is described in which the auxiliary wall part 12c rises from the edge of the through-hole 12a toward the rear wall part 14 side, the auxiliary wall part 12c may be formed so as to rise from the edge of the through-hole 12a toward the opposite side to the rear wall part 14. In other words, the auxiliary wall part 12c may be formed so as to rise in the frontward direction from the edge of the through-hole 12a. Furthermore, although in the foregoing embodiment a case was described in which the auxiliary wall part 14c rises toward the front wall part 12 side from the edge of the through-hole 14a, the auxiliary wall part 14c may be formed so as to rise toward the opposite side to the front wall part 12 from the edge of the through-hole 14a. In other words, the auxiliary wall part 14c may be formed so as to rise in the rearward direction from the edge of the through-hole 14a. As described above, an auxiliary wall part may be provided so as to project toward the inner side of the automobile structural member or may be provided so as to project toward the outer side of the automobile structural member.

In addition, although in the foregoing embodiment a case is described in which the plurality of through-holes 12a are formed so as to be aligned in a row along the longitudinal direction of the main wall part 12b (in the present embodiment, the vertical direction) as seen from the front of the vehicle, the plurality of through-holes 12a may be arranged so as to be aligned in a staggered manner along the longitudinal direction of the main wall part 12b. The same also applies with respect to the plurality of through-holes 14a.

Although in the foregoing embodiment a plurality of through-holes and a plurality of auxiliary wall parts are provided in each of the front wall part and the rear wall part, for example, the plurality of through-holes and the plurality of auxiliary wall parts need not be provided in the rear wall part 14, as in the case of a center pillar 10 illustrated in FIG. 21. Further, the plurality of through-holes and the plurality of auxiliary wall parts need not be provided in the front wall part 12, as in the case of a center pillar 10 illustrated in FIG. 22. In other words, in the automobile structural member according to the present invention, it suffices that the plurality of through-holes and the plurality of auxiliary wall parts are provided in at least one of the front wall part and the rear wall part. Even in such a case, the advantageous effect of improving the strength of the front wall part or the rear wall part by means of the auxiliary wall parts is obtained, and the absorbed amount of collision energy can be increased. Note that, in a case where the plurality of through-holes and the plurality of auxiliary wall parts are provided in both the front wall part and the rear wall part, the advantageous effect of absorbing collision energy can be further enhanced since deformation modes with respect to a load can be made uniform between the front wall part and the rear wall part.

Further, although in the foregoing embodiment a case is described in which the present invention is applied to a cylindrical automobile structural member (center pillar) having a front wall part, a rear wall part and a pair of side wall parts, the number of side wall parts may be one. In other words, the present invention can be applied to an automobile structural member having a front wall part and a rear wall part that face each other in the front-and-rear direction of the vehicle, and a side wall part that connects the front wall part and the rear wall part. Specifically, for example, the present invention can also be applied to an automobile structural member having a cross-sectional U shape, as illustrated in FIG. 13. Further, although in the foregoing embodiment a case is described in which the front wall part, the rear wall part and the side wall part are formed so as to extend in the vertical direction, the front wall part, the rear wall part and the side wall part may be formed so as to extend in the vehicle width direction. In this case, the side wall part may be formed so as to connect an upper edge part of the front wall part and an upper edge part of the rear wall part, or may be formed so as to connect a lower edge part of the front wall part and a lower edge part of the rear wall part.

Second Embodiment

An automobile structural member according to a second embodiment of the present invention is a member in which, when used as a constituent member of a vehicle body, a first wall part and a second wall part face each other in the vertical direction. Further, the automobile structural member according to the second embodiment is, for example, when used as a constituent member of a vehicle body, a member in which the longitudinal direction of a main wall part to be described later is closer to the vehicle width direction or the front-and-rear direction than the vertical direction. The same also applies with respect to an automobile structural member according to a third embodiment and a fourth embodiment to be described later. Note that, the phrase "the longitudinal direction is closer to the vehicle width direction or the front-and-rear direction than the vertical direction" means that an angle (acute angle) formed by the longitudinal direction and the vehicle width direction or an angle (acute angle) formed by the longitudinal direction and the front-and-rear direction is less than 45°.

FIG. 23 is a perspective view illustrating the automobile structural member according to the second embodiment of the present invention. Note that, in FIG. 23, arrows are shown which indicate the vertical direction, a first direction and a second direction which are orthogonal to each other. FIG. 24 is a view illustrating a schematic cross-section (cross section perpendicular to the first direction) of a portion corresponding to a line A-A in FIG. 23.

As illustrated in FIG. 23 and FIG. 24, an automobile structural member 10 (hereinafter, abbreviated to a "structural member 10") according to the present embodiment is formed so as to extend in a first direction perpendicular to the vertical direction and is formed in a cylindrical shape. As described in detail later, the structural member 10 includes a sheet-like vertical wall part 12, a sheet-like vertical wall part 14 that faces the vertical wall part 12 in the thickness direction of the vertical wall part 12, and a top plate part 16 that connects the vertical wall part 12 and the vertical wall part 14. In the present embodiment, the vertical wall part 12 corresponds to a first wall part, the vertical wall part 14 corresponds to a second wall part, and the top plate part 16 corresponds to a third wall part.

Note that, in the present description, the phrase "member that extends in the first direction" means a member, the longitudinal direction of which coincides with the first direction in plan view and is closer to the first direction than the vertical direction as seen from the second direction. In other words, the phrase "member that extends in the first direction" means a member, the longitudinal direction of which coincides with the first direction in plan view and an angle (acute angle) formed by the longitudinal direction and the first direction is less than 45° as seen from the second direction. Accordingly, a member that extends in the first direction is not limited to a member, the longitudinal direction of which coincides with the first direction as seen from the second direction.

In the present embodiment, the structural member 10 has a first member 10*a* which has a hat-shaped cross-sectional shape, and a sheet-like second member 10*b*. The first member 10*a* has the pair of vertical wall parts 12 and 14, the top plate part 16, and a pair of flange parts 18 and 20. In the present embodiment, the respective parts of the first member 10*a* (vertical wall parts 12 and 14, top plate part 16 and flange parts 18 and 20), and the second member 10*b* each have a long-length shape, and are formed so as to extend in the first direction.

The vertical wall part 12 and the vertical wall part 14 are provided so as to face each other in the vertical direction. The top plate part 16 is provided so as to connect an edge part on one side in the second direction of the vertical wall part 12 and an edge part on one side in the second direction of the vertical wall part 14. The flange part 18 is provided so as to extend upward from an edge part of the vertical wall part 12 which is an edge part on the opposite side to the top plate part 16 in the second direction, and the flange part 20 is provided so as to extend downward from an edge part of the vertical wall part 14 which is an edge part on the opposite side to the top plate part 16 in the second direction. In the present embodiment, the flange parts 18 and 20 and the second member 10*b* are welded to each other. By this means, the second member 10*b* is connected to the vertical wall part 12 and the vertical wall part 14 through the flange parts 18 and 20. The second member 10*b* is provided so as to face the top plate part 16 in the second direction.

In the present embodiment, the vertical wall part 12 functions as an upper wall part of the structural member 10, and the vertical wall part 14 functions as a lower wall part of the structural member 10. In the structural member 10, the top plate part 16 functions as a side wall part which connects an edge part on one side in the second direction of the vertical wall part 12 and an edge part on one side in the second direction of the vertical wall part 14. Further, in the structural member 10, the flange parts 18 and 20 and the second member 10*b* function as a side wall part 22 which connects an edge part on the other side in the second direction of the vertical wall part 12 and an edge part on the other side in the second direction of the vertical wall part 14.

Note that, in the present description, a state in which the internal surface of the upper wall part is facing downward and the internal surface of the lower wall part is facing upward is defined as a state in which the upper wall part and the lower wall part are facing each other in the vertical direction. Accordingly, although the vertical wall part 12 (upper wall part) and the vertical wall part 14 (lower wall part) illustrated in FIG. 23 and FIG. 24 are not parallel to each other, they are facing each other in the vertical direction. Further, in the present description, a state in which the internal surface of a side wall part on one side in the second direction faces the other side in the second direction, and the internal surface of a side wall part on the other side in the second direction faces the one side in the second direction is defined as a state in which the pair of side wall parts face each other in the second direction.

As illustrated in FIG. 23 and FIG. 24, the vertical wall part 12 has a sheet-like main wall part 12*b* in which a plurality of through-holes 12*a* are formed, and a plurality of auxiliary wall parts 12*c* which are provided for the plurality of through-holes 12*a*, respectively. In the present embodiment, a direction along a connecting part 17*a* between the main wall part 12*b* and the top plate part 16 is the longitudinal direction of the main wall part 12*b*. The plurality of through-holes 12*a* are formed so as to be aligned along the longitudinal direction of the main wall part 12*b*. In the present embodiment, the plurality of through-holes 12*a* are formed so as to be aligned along the first direction. In FIG. 23, two through-holes 12*a* and two auxiliary wall parts 12*c* are illustrated. The auxiliary wall part 12*c* can be formed, for example, by a known burring method. The same applies with respect to an auxiliary wall part 14*c* to be described later.

The plurality of auxiliary wall parts 12*c* are each provided so as to rise toward the vertical wall part 14 side from the edge of the corresponding through-hole 12*a*. In other words, the plurality of auxiliary wall parts 12*c* are each provided so as to rise in the downward direction. Referring to FIG. 24, in the thickness direction of the main wall part 12*b*, a distance H1 between the front end of each auxiliary wall part 12*c* and the main wall part 12*b* is preferably 2.8 mm or more, more preferably is 3.0 mm or more, and further preferably is 4.0 mm or more.

As illustrated in FIG. 23 and FIG. 24, the vertical wall part 14 has a sheet-like main wall part 14*b* in which a plurality of through-holes 14*a* are formed, and a plurality of auxiliary wall parts 14*c* which are provided for the plurality of through-holes 14*a*, respectively. In the present embodiment, a direction along a connecting part 17*b* between the main wall part 14*b* and the top plate part 16 is the longitudinal direction of the main wall part 14*b*. The plurality of through-holes 14*a* are formed so as to be aligned along the longitudinal direction of the main wall part 14*b*. In the present embodiment, the plurality of through-holes 14*a* are formed so as to be aligned in the first direction, similarly to the plurality of through-holes 12*a*.

The plurality of auxiliary wall parts 14*c* are each provided so as to rise toward the vertical wall part 12 side from the edge of the corresponding through-hole 14*a*. In other words, the plurality of auxiliary wall parts 14*c* are each provided so as to rise in the upward direction. In the thickness direction of the main wall part 14*b*, a distance H2 between the front end of each auxiliary wall part 14*c* and the main wall part 14*b* is preferably 2.8 mm or more, more preferably is 3.0 mm or more, and further preferably is 4.0 mm or more.

In the present embodiment, as seen from the thickness direction of the main wall part 12*b*, a direction perpendicular to the longitudinal direction of the main wall part 12*b* (direction perpendicular to the extending direction of the connecting part 17*a*) is taken as the width direction of the main wall part 12*b*. The width (length in the width direction) of the main wall part 12*b* is, for example, set within a range of 50 mm to 200 mm. Further, in the present embodiment, as seen from the thickness direction of the main wall part 14b, a direction perpendicular to the longitudinal direction of the main wall part 14b (direction perpendicular to the extending direction of the connecting part 17b) is taken as the width direction of the main wall part 14b. The width (length in the width direction) of the main wall part 14b is, for example, set within a range of 50 mm to 200 mm.

Referring to FIG. 23, similarly to the foregoing first embodiment, if the auxiliary wall parts 12c are spaced too far apart from each other, there is a risk that, when crushing occurs, the main wall part 12b will buckle at a portion located between adjacent auxiliary wall parts 12c. Therefore, in the present embodiment also, the distance (distance in the longitudinal direction of the main wall part 12b) between two auxiliary wall parts 12c that are adjacent is set so as to be 1.4 times or less the width of the main wall part 12b at the portion between the relevant two auxiliary wall parts 12c. Similarly, the distance (distance in the longitudinal direction of the main wall part 14b) between two auxiliary wall parts 14c that are adjacent is set so as to be 1.4 times or less the width of the main wall part 14b at the portion between the relevant two auxiliary wall parts 14c. Note that, preferably the shortest distance between two auxiliary wall parts 12c is set so as to be 1.4 times or less the width of the main wall part 12b at the portion between the two auxiliary wall parts 12c, and the shortest distance between two auxiliary wall parts 14c is set so as to be 1.4 times or less the width of the main wall part 14b at the portion between the two auxiliary wall parts 14c.

Note that, in the present embodiment also, the distance between two auxiliary wall parts is determined by taking the base (boundary part with respect to the main wall part) of the respective auxiliary wall parts as a reference. Accordingly, as illustrated in FIG. 26 which is described later, even in a case where auxiliary wall parts incline with respect to the main wall part, the phrase "distance between two auxiliary wall parts" means the distance between the bases of the two auxiliary wall parts, and not the distance between the front ends of the two auxiliary wall parts.

Further, in the present embodiment also, the distance between two through-holes 12a that are adjacent (distance in the longitudinal direction of the main wall part 12b) is set so as to be 1.4 times or less the width of the main wall part 12b at the portion between the relevant two through-holes 12a. Further, the distance between two through-holes 14a that are adjacent (distance in the longitudinal direction of the main wall part 14b) is also similarly set so as to be 1.4 times or less the width of the main wall part 14b at the portion between the relevant two through-holes 14a.

Note that, similarly to the foregoing first embodiment, if the distance between two auxiliary wall parts (through-holes) that are adjacent is too short, there is a risk that forming of the automobile structural member will become difficult. Therefore, in the present embodiment, the distance in the aforementioned longitudinal direction between two auxiliary wall parts 12c that are adjacent is preferably set so as to be 0.2 times or more the width of the main wall part 12b at the portion between the relevant two auxiliary wall parts 12c, and more preferably is set so as to be 0.4 times or more the aforementioned width, and further preferably is set so as to be 0.6 times or more the aforementioned width. Similarly, the distance in the aforementioned longitudinal direction between two auxiliary wall parts 14c that are adjacent is also preferably set so as to be 0.2 times or more the width of the main wall part 14b at the portion between the relevant two auxiliary wall parts 14c, and more preferably is set so as to be 0.4 times or more the aforementioned width, and further preferably is set so as to be 0.6 times or more the aforementioned width. Further, the distance in the aforementioned longitudinal direction between two through-holes 12a that are adjacent is preferably set so as to be 0.2 times or more the width of the main wall part 12b at the portion between the relevant two through-holes 12a, and more preferably is set so as to be 0.4 times or more the aforementioned width, and further preferably is set so as to be 0.6 times or more the aforementioned width. Similarly, the distance in the aforementioned longitudinal direction between two through-holes 14a that are adjacent is also preferably set so as to be 0.2 times or more the width of the main wall part 14b at the portion between the relevant two through-holes 14a, and more preferably is set so as to be 0.4 times or more the aforementioned width, and further preferably is set so as to be 0.6 times or more the aforementioned width.

Note that, in the present embodiment also, in a case where the width of a main wall part at a portion between two auxiliary wall parts (through-holes) is not constant, the phrase "width of the main wall part at the portion between the two auxiliary wall parts (through-holes)" means the largest value of the width of the main wall part at the portion between the two auxiliary wall parts (through-holes). However, the distance between two auxiliary wall parts (through-holes) that are adjacent (distance in the longitudinal direction of the main wall part or shortest distance) may be set so as to be 1.4 times or less the smallest value of the width of the main wall part at the portion between the relevant two auxiliary wall parts (through-holes), or may be set so as to be 0.2 times or more the smallest value of the width of the main wall part at the portion between the relevant two auxiliary wall parts (through-holes).

Note that, the number of the through-holes 12a and the auxiliary wall parts 12c is not limited to two, respectively, and may be three or more. The same applies with respect to the through-holes 14a and the auxiliary wall parts 14c.

FIG. 25 is a view illustrating a portion at which the through-hole 12a is formed in the vertical wall part 12 as seen from the inner side of the structural member 10. Note that, in FIG. 25, an imaginary straight line L that, as seen from the thickness direction of the main wall part 12b, passes through the center of the through-hole 12a and is parallel to the longitudinal direction of the main wall part 12b is indicated by a dashed line. As illustrated in FIG. 25, in the present embodiment, as seen from the thickness direction of the main wall part 12b, the auxiliary wall part 12c is provided so as to intersect with the straight line L on one side and the other side of the through-hole 12a in the longitudinal direction of the main wall part 12b. Although diagrammatic representation is omitted from the drawings, the auxiliary wall part 14c is also similarly provided so as to intersect with a straight line (imaginary line) that, as seen from the thickness direction of the main wall part 14b, passes through the center of the through-hole 14a and is parallel to the longitudinal direction of the main wall part 14b, on one side and the other side of the through-hole 14a in the longitudinal direction of the main wall part 14b. In the present embodiment, each through-hole 12a has a circular shape, and each auxiliary wall part 12c has a cylindrical shape (in the present embodiment, a circular cylindrical shape). Similarly, in the present embodiment, each through-hole 14a has a circular shape, and each auxiliary wall part 14c has a cylindrical shape (in the present embodiment, a circular cylindrical shape).

Referring to FIG. 24, similarly to the foregoing first embodiment, the respective lengths of the auxiliary wall parts 12c and 14c in the width direction of the corresponding main wall part 12b or 14b are each preferably 0.2 times or more the width of the corresponding main wall part 12b or 14b, and more preferably 0.3 times or more. Further, the respective lengths of the auxiliary wall parts 12c and 14c in the width direction of the corresponding main wall part 12b or 14b are each preferably 1.0 times or less the width of the corresponding main wall part 12b or 14b, and more preferably 0.9 times or less.

Note that, similarly to the foregoing first embodiment, in the present embodiment also, the respective lengths of the through-hole 12a and the auxiliary wall part 12c in the width direction of the main wall part 12b are set to, for example, a size that is 0.4 to 0.7 times the width of the main wall part 12b. Similarly, the respective lengths of the through-hole 14a and the auxiliary wall part 14c in the width direction of the main wall part 14b are set to, for example, a size that is 0.4 to 0.7 times the width of the main wall part 14b.

Advantageous Effects of Second Embodiment

In the structural member 10 according to the present embodiment, a plurality of the auxiliary wall parts 12c are formed in the vertical wall part 12, and a plurality of the auxiliary wall parts 14c are formed in the vertical wall part 14. By this means, the strength of the structural member 10 with respect to a load in the second direction can be enhanced. Therefore, for example, even in a case where another automobile or the like collides from the second direction with an automobile equipped with the structural member 10, the load can be adequately received by the structural member 10, and the collision energy can be adequately absorbed. By this means, the safety inside the cabin at the time of a side impact can be improved. Further, in the present embodiment, since a plurality of the through-holes 12a are formed in the vertical wall part 12 and a plurality of the through-holes 14a are formed in the vertical wall part 14, the weight of the structural member 10 can be reduced. Thus, according to the present embodiment, the automobile structural member 10 which is light in weight and which has excellent strength with respect to a collision is obtained.

Modification of Second Embodiment

Although in the foregoing embodiment a case was described in which the auxiliary wall part 12c rises perpendicularly with respect to the main wall part 12b, as illustrated in FIG. 26, the auxiliary wall part 12c may incline with respect to the main wall part 12b. The same applies with respect to the auxiliary wall part 14c. In this case also, in the thickness direction of the main wall part 12b, the distance H1 between the front end of the auxiliary wall part 12c and the main wall part 12b is preferably 2.8 mm or more, more preferably is 3.0 mm or more, and further preferably is 4.0 mm or more. Further, in the thickness direction of the main wall part 14b, the distance H2 between the front end of the auxiliary wall part 14c and the main wall part 14b is preferably 2.8 mm or more, more preferably is 3.0 mm or more, and further preferably is 4.0 mm or more. Note that, although in the example illustrated in FIG. 26 the auxiliary wall part 12c is formed so that the diameter decreases progressively toward the front end side (center side of the structural member 10), the auxiliary wall part 12c may be formed so that the diameter increases progressively toward the front end side. The same applies with respect to the auxiliary wall part 14c.

Note that, similarly to the foregoing first embodiment, in the present embodiment also an angle that the main wall part and the auxiliary wall part form is preferably set within the range of 50 to 130°, more preferably is set within the range of 70 to 110°, and further preferably is set within the range of 80 to 100°.

In the present embodiment also, as illustrated in FIG. 27, the through-hole 12a may have a polygonal shape (in FIG. 27, a rectangular shape), and the auxiliary wall part 12c may have a polygonal cylindrical shape. Although a detailed description is omitted here, the same also applies with respect to the through-hole 14a and the auxiliary wall part 14c.

Further, similarly to the foregoing first embodiment, in the present embodiment also, as illustrated in FIG. 28, the auxiliary wall part 12c may be composed of a plurality of walls 12d and 12e that are formed so as to be spaced apart from each other in the circumferential direction of the through-hole 12a. The same applies with respect to the auxiliary wall part 14c. However, in the present embodiment also, each of the auxiliary wall parts is preferably provided so that, as seen from the thickness direction of the main wall part, on one side and the other side of the corresponding through-hole in the longitudinal direction of the main wall part, the auxiliary wall part intersects with a straight line (imaginary line) that passes through the center of the through-hole and is parallel to the longitudinal direction of the main wall part. Note that, in the example illustrated in FIG. 28, the wall 12d is formed along the edge of the through-hole 12a so as to extend in the second direction along one end in the first direction of the through-hole 12a, and the wall 12e is formed along the edge of the through-hole 12a so as to extend in the second direction along the other end in the first direction of the through-hole 12a.

Furthermore, similarly to the foregoing first embodiment, even in a case where the through-hole 12a is a polygonal shape (see FIG. 27), the auxiliary wall part 12c may be composed of a plurality of walls. In this case, for example, as seen from the thickness direction of the main wall part 12b, two walls among the plurality of walls are provided so as to intersect with a straight line L which passes through the center of the through-hole 12a and is parallel to the longitudinal direction of the main wall part 12b. Further, although diagrammatic representation is omitted here, in a case where the through-hole 14a is a polygonal shape also, the auxiliary wall part 14c may be similarly composed of a plurality of walls.

Further, similarly to the foregoing first embodiment, in the present embodiment also, the auxiliary wall parts may be provided so as to project toward the inner side of the automobile structural member or may be provided so as to project toward the outer side of the automobile structural member.

Further, similarly to the foregoing first embodiment, in the present embodiment also, the plurality of through-holes may be arranged in a staggered manner.

Further, although in the foregoing embodiment a case is described in which the present invention is applied to a cylindrical structural member 10, the present invention can be applied to various kinds of automobile structural members having an upper wall part and a lower wall part that face each other in the vertical direction and that extend in the first direction, and having a side wall part that connects the upper wall part and the lower wall part. Specifically, for example, the structural member 10 need not have the second member 10b.

Although in the aforementioned embodiment the top plate part 16 and the side wall part 22 are arranged parallel to the vertical direction, the top plate part 16 and the side wall part 22 may be inclined with respect to the vertical direction.

Third Embodiment

FIG. 29 is a perspective view that illustrates an automobile structural member according to a third embodiment of the present invention. As illustrated in FIG. 29, an automobile structural member 30 according to the present embodiment (hereinafter, abbreviated to a "structural member 30") is formed so as to extend in the first direction and is formed in a cylindrical shape, similarly to the structural member 10 illustrated in FIG. 23. The structural member 30 according to the present embodiment differs from the structural member 10 illustrated in FIG. 23 in that the structural member 30 includes a second member 10*c* instead of the second member 10*b*.

Similarly to the first member 10*a*, the second member 10*c* has a hat-shaped cross-sectional shape, and has a pair of vertical wall parts 32 and 34, a top plate part 36 and flange parts 38 and 40. Each part (vertical wall parts 32 and 34, top plate part 36 and flange parts 38 and 40) of the second member 10*c* has a long-length shape, and is formed to extend in the first direction.

The vertical wall part 32 and the vertical wall part 34 are provided so as to face each other in the vertical direction. The top plate part 36 is provided so as to connect an edge part of the vertical wall part 32 that is the edge part on the opposite side to the first member 10*a* in the second direction and an edge part of the vertical wall part 34 that is the edge part on the opposite side to the first member 10*a* in the second direction. The flange part 38 is provided so as to extend upward from an edge part on the first member 10*a* side in the second direction of the vertical wall part 32, and the flange part 40 is provided so as to extend downward from an edge part on the first member 10*a* side in the second direction of the vertical wall part 34. In the present embodiment, the flange part 18 of the first member 10*a* and the flange part 38 of the second member 10*c* are welded to each other, and the flange part 20 of the first member 10*a* and the flange part 40 of the second member 10*c* are welded to each other. Note that, in the present embodiment, through-holes and auxiliary wall parts are not formed in the vertical wall part 32 and the vertical wall part 34.

In the present embodiment, a first wall part (upper wall part) of the structural member 30 is composed of the vertical wall part 12 and the vertical wall part 32, and a second wall part (lower wall part) of the structural member 30 is composed of the vertical wall part 14 and the vertical wall part 34. Further, the top plate part 16 and the top plate part 36 function as a third wall part (side wall part) of the structural member 30.

In the structural member 30 according to the present embodiment also, similar operational advantages to those of the structural member 10 according to the foregoing second embodiment are obtained. In other words, the structural member 30 according to the present embodiment is light in weight and has excellent strength with respect to a load in the second direction.

Note that, although in the structural member 30 illustrated in FIG. 29 a through-hole and an auxiliary wall part are not formed in the vertical wall part 32 or the vertical wall part 34, a plurality of through-holes and a plurality of auxiliary wall parts may be formed in each of the vertical wall part 32 and the vertical wall part 34, similarly to the vertical wall part 12 and the vertical wall part 14. Note that, in the present embodiment, it suffices that a plurality of through-holes and a plurality of auxiliary wall parts are formed in the first wall part (upper wall part) that is composed of the vertical wall part 12 and the vertical wall part 32, and that a plurality of through-holes and a plurality of auxiliary wall parts are formed in the second wall part (lower wall part) that is composed of the vertical wall part 14 and the vertical wall part 34. Accordingly, a plurality of through-holes and a plurality of auxiliary wall parts may be formed in only one of the vertical wall part 12 and the vertical wall part 32, and a plurality of through-holes and a plurality of auxiliary wall parts may be formed in only one of the vertical wall part 14 and the vertical wall part 34.

Note that, in the structural member 30 according to the present embodiment, similarly to the foregoing second embodiment and the modification thereof, various kinds of through-holes and various kinds of auxiliary wall parts can be utilized.

Further, in the structural member 30 according to the present embodiment also, the top plate parts 16 and 36 may incline with respect to the horizontal direction.

Fourth Embodiment

FIG. 30 is a perspective view illustrating an automobile structural member according to a fourth embodiment of the present invention. Note that, in FIG. 30, arrows are shown which indicate the vertical direction, a first direction and a second direction which are perpendicular to each other. FIG. 31 is a view illustrating a schematic cross-section (cross section perpendicular to the first direction) of a portion corresponding to a line B-B in FIG. 30.

As illustrated in FIG. 30 and FIG. 31, an automobile structural member 50 (hereinafter, abbreviated to a "structural member 50") according to the present embodiment is formed so as to extend in the first direction perpendicular to the vertical direction and is formed in a cylindrical shape.

In the present embodiment, the structural member 50 has a first member 50*a* which has a hat-shaped cross-sectional shape, and a sheet-like second member 50*b*. The first member 50*a* has the pair of vertical wall parts 52 and 54, a top plate part 56, and a pair of flange parts 58 and 60. In the present embodiment, the respective parts of the first member 50*a* (vertical wall parts 52 and 54, top plate part 56 and flange parts 58 and 60), and the second member 50*b* each have a long-length shape, and are formed so as to extend in the first direction.

The vertical wall part 52 and the vertical wall part 54 are provided so as to face each other in the second direction. The top plate part 56 is provided so as to connect an upper edge part of the vertical wall part 52 and an upper edge part of the vertical wall part 54. The flange part 58 is provided so as to extend to the outer side of the structural member 50 in the second direction from a lower edge part of the vertical wall part 52, and the flange part 60 is provided so as to extend to the outer side of the structural member 50 from a lower edge part of the vertical wall part 54. In the present embodiment, the flange parts 58 and 60 are welded to the second member 50*b*. The second member 50*b* is provided so as to face the top plate part 56 in the thickness direction (vertical direction) of the top plate part 56.

In the present embodiment, the top plate part 56 functions as an upper wall part of the structural member 50, and the second member 50*b* functions as a lower wall part of the structural member 50. In the structural member 50, the vertical wall part 52 and the flange part 58 function as a side wall part 62 that connects an edge part on one side in the second direction of the top plate part 56 and an edge part on one side in the second direction of the second member 50b. Further, in the structural member 50, the vertical wall part 54 and the flange part 60 function as a side wall part 64 that connects an edge part on the other side in the second direction of the top plate part 56 and an edge part on the other side in the second direction of the second member 50b. In the present embodiment, the top plate part 56 corresponds to a first wall part, the second member 50b corresponds to a second wall part, and the side wall parts 62 and 64 correspond to a third wall part, respectively.

As illustrated in FIG. 30 and FIG. 31, the top plate part 56 has a sheet-like main wall part 72b in which a plurality of through-holes 72a are formed, and a plurality of auxiliary wall parts 72c which are provided for the plurality of through-holes 72a, respectively. In the present embodiment, the direction along a connecting part 77a between the main wall part 72b and the side wall part 62 is the longitudinal direction of the main wall part 72b. Note that, the direction along a connecting part 77b between the main wall part 72b and the side wall part 64 may also be taken as the longitudinal direction of the main wall part 72b. The plurality of through-holes 72a are formed so as to be aligned along the longitudinal direction of the main wall part 72b. In the present embodiment, the plurality of through-holes 72a are formed so as to be aligned in the first direction. Each of the plurality of auxiliary wall parts 72c is provided so as to rise in the downward direction from the edge of the corresponding through-hole 72a.

The second member 50b has a sheet-like main wall part 74b in which a plurality of through-holes 74a are formed (in FIG. 30 and FIG. 31, only one through-hole 74a is diagrammatically represented), and a plurality of auxiliary wall parts 74c which are provided for the plurality of through-holes 74a, respectively. In the present embodiment, a direction along a connecting part 77c between the main wall part 74b and the side wall part 62 is the longitudinal direction of the main wall part 74b. Note that, a direction along a connecting part 77d between the main wall part 74b and the side wall part 64 may be also taken as the longitudinal direction of the main wall part 74b. The plurality of through-holes 74a are formed so as to be aligned along the longitudinal direction of the main wall part 74b. In the present embodiment, the plurality of through-holes 74a are formed so as to be aligned in the first direction. Each of the plurality of auxiliary wall parts 74c is provided so as to rise in the upward direction from the edge of the corresponding through-hole 74a.

In the present embodiment, as seen from the thickness direction of the main wall part 72b, a direction perpendicular to the longitudinal direction of the main wall part 72b (direction perpendicular to the extending direction of the connecting part 77a or connecting part 77b) is taken as the width direction of the main wall part 72b. Further, in the present embodiment, as seen from the thickness direction of the main wall part 74b, a direction perpendicular to the longitudinal direction of the main wall part 74b (direction perpendicular to the extending direction of the connecting part 77c or connecting part 77d) is taken as the width direction of the main wall part 74b. The widths (length in the width direction) of the main wall parts 72b and 74b are set, for example, within the range of 50 mm to 200 mm, respectively.

Referring to FIG. 31, similarly to the foregoing embodiment, in the present embodiment also the distance (distance in the longitudinal direction of the main wall part 72b) between two auxiliary wall parts 72c that are adjacent is set to 1.4 times or less the width of the main wall part 72b at a portion between the relevant two auxiliary wall parts 72c. Similarly, the distance (distance in the longitudinal direction of the main wall part 74b) between two auxiliary wall parts 74c that are adjacent is set so as to be 1.4 times or less the width of the main wall part 74b at a portion between the relevant two auxiliary wall parts 74c. Note that, preferably the shortest distance between two auxiliary wall parts 72c is set so as to be 1.4 times or less the width of the main wall part 72b at a portion between the two auxiliary wall parts 72c, and the shortest distance between two auxiliary wall parts 74c is set so as to be 1.4 times or less the width of the main wall part 74b at a portion between the two auxiliary wall parts 74c.

Further, similarly to the foregoing embodiment, in the present embodiment also the distance in the aforementioned longitudinal direction between two auxiliary wall parts 72c that are adjacent is preferably set so as to be 0.2 times or more the width of the main wall part 72b at a portion between the relevant two auxiliary wall parts 72c, and more preferably is set so as to be 0.4 times or more the aforementioned width, and further preferably is set so as to be 0.6 times or more the aforementioned width. Similarly, the distance in the aforementioned longitudinal direction between two auxiliary wall parts 74c that are adjacent is also preferably set so as to be 0.2 times or more the width of the main wall part 74b at a portion between the relevant two auxiliary wall parts 74c, and more preferably is set so as to be 0.4 times or more the aforementioned width, and further preferably is set so as to be 0.6 times or more the aforementioned width. Further, the distance in the aforementioned longitudinal direction between two through-holes 72a that are adjacent is preferably set so as to be 0.2 times or more the width of the main wall part 72b at a portion between the relevant two through-holes 72a, and more preferably is set so as to be 0.4 times or more the aforementioned width, and further preferably is set so as to be 0.6 times or more the aforementioned width. Similarly, the distance in the aforementioned longitudinal direction between two through-holes 74a that are adjacent is also preferably set so as to be 0.2 times or more the width of the main wall part 74b at a portion between the relevant two through-holes 74a, and more preferably is set so as to be 0.4 times or more the aforementioned width, and further preferably is set so as to be 0.6 times or more the aforementioned width.

Similarly to the foregoing embodiments, the length of an auxiliary wall part in the width direction of a main wall part is preferably 0.2 times or more the width of the main wall part, and more preferably is 0.3 times or more the width of the main wall part. Further, the length of an auxiliary wall part in the width direction of a main wall part is preferably 1.0 times or less the width of the main wall part, and more preferably is 0.9 times or less the width of the main wall part. In the present embodiment also, the length of a through-hole and the length of an auxiliary wall part in the width direction of a main wall part are each set to, for example, a size that is within a range of 0.4 to 0.7 times the width of the main wall part.

A distance H1 between the front end of the auxiliary wall part 72c and the main wall part 72b in the thickness direction of the main wall part 72b, and a distance H2 between the front end of the auxiliary wall part 74c and the main wall part 74b in the thickness direction of the main wall part 74b are set in a similar manner to the distances H1 and H2 in the foregoing embodiments. Further, an angle $\theta_1$ that the main wall part 72b and the auxiliary wall part 72c form, and an angle θ₂ that the main wall part 74b and the auxiliary wall part 74c form are also set in a similar manner to the foregoing embodiments. Note that, in the structural member 50 according to the present embodiment also, similarly to the foregoing embodiments, since various kinds of through-holes and various kinds of auxiliary wall parts can be utilized, a detailed description of the through-holes and the auxiliary wall parts is omitted here. Further, in the present embodiment also, the plurality of through-holes may be arranged in a staggered manner.

In the structural member 50 according to the present embodiment also, similar operational advantages to those of the foregoing embodiments are obtained. In other words, the structural member 50 according to the present embodiment is light in weight and has excellent strength with respect to a load in the second direction.

Note that, although in the structural member 50 illustrated in FIG. 30 and FIG. 31, the first member 50a is arranged at a position that is above the second member 50b, the second member 50b may be arranged at a position that is above the first member 50a. In other words, the structural member 50 illustrated in FIG. 30 and FIG. 31 may be vertically inverted and utilized. In such a case, the top plate part 56 of the first member 50a functions as the lower wall part, and the second member 50b functions as the upper wall part.

Further, although in the aforementioned structural member 50 the main wall part 72b and the main wall part 74b are arranged horizontally, the main wall part 72b and the main wall part 74b may be inclined with respect to the horizontal direction.

Modifications of Second to Fourth Embodiments

Although in the foregoing embodiments a plurality of through-holes and a plurality of auxiliary wall parts are provided in each of the upper wall part and the lower wall part, the plurality of through-holes and the plurality of auxiliary wall parts need not be provided in one of the upper wall part and the lower wall part. In other words, in the automobile structural member according to the present invention, it suffices that a plurality of through-holes and a plurality of auxiliary wall parts are provided in at least one of the upper wall part and the lower wall part. Even in such a case, the advantageous effect of improving the strength of the upper wall part or the lower wall part by means of the auxiliary wall part is obtained, and the absorbed amount of collision energy can be increased. Note that, in a case where the plurality of through-holes and the plurality of auxiliary wall parts are provided in both the upper wall part and the lower wall part, the advantageous effect of absorbing collision energy can be further enhanced since the deformation modes with respect to a load can be made uniform between the upper wall part and the lower wall part.

Examples of Utilization in Vehicle Body

Hereunder, examples of utilization of the automobile structural members according to the second to fourth embodiments are described. FIG. 32 is a schematic perspective view illustrating one part of a vehicle body equipped with automobile structural members according to the present embodiments, and FIG. 33 is a schematic bottom view illustrating one part of the vehicle body.

An automobile structural member according to the present embodiments can be utilized, for example, by being arranged so that, in plan view, the longitudinal direction of a main wall part (first direction) is closer to the front-and-rear direction of the vehicle body than the vehicle width direction. In other words, an automobile structural member according to the present embodiments can be utilized by being arranged so that, in plan view, an angle (acute angle) that the longitudinal direction of the main wall part (first direction) and the front-and-rear direction of the vehicle body form is less than 45°.

Referring to FIG. 32 and FIG. 33, for example, in a vehicle body 80, the structural member 10 illustrated in FIG. 23 and the structural member 30 illustrated in FIG. 29 can be utilized as a side sill 82 in a manner so that the longitudinal direction of the main wall parts (first direction) is closer to the front-and-rear direction of the vehicle body than the vehicle width direction. In this case, in plan view, the second direction (see FIGS. 23 and 29) is closer to the vehicle width direction than the front-and-rear direction of the vehicle body.

In this case, if the automobile is subjected to a side impact by another automobile or the like, a load in the vehicle width direction will act on the side sill 82. In regard to this point, in a case where an automobile structural member according to the present embodiments is used as the side sill 82 as described above, if the automobile is subjected to a side impact, a load in the second direction (vehicle width direction) will act on the automobile structural member (the side sill 82). As mentioned above, the automobile structural members according to the present embodiments have excellent strength with respect to a load in the second direction. Accordingly, by utilizing an automobile structural member according to the present embodiments as the side sill 82, even in a case where the automobile is subjected to a side impact, collision energy can be adequately absorbed at the side sill 82. By this means, the safety inside the cabin at the time of a side impact can be enhanced.

In addition, an automobile structural member according to the present embodiments can be utilized, for example, by being arranged so that, in plan view, the longitudinal direction of a main wall part (first direction) is closer to the vehicle width direction than the front-and-rear direction of the vehicle body. In other words, an automobile structural member according to the present embodiments can be utilized by being arranged so that, in plan view, an angle (acute angle) that the longitudinal direction of the main wall part (first direction) and the vehicle width direction form is less than 45°.

Referring to FIG. 32 and FIG. 33, for example, in the vehicle body 80, the structural member 10 illustrated in FIG. 23 and the structural member 30 illustrated in FIG. 29 can be utilized as bumper beams (a front bumper beam 84 and a rear bumper beam 86) in a manner so that the longitudinal direction of the main wall parts (first direction) is closer to the vehicle width direction than the front-and-rear direction of the vehicle body.

Further, for example, in the vehicle body 80, the structural member 10 illustrated in FIG. 23 can be utilized as a cross member (for example, a dash cross member that is not diagrammatically represented) in a manner so that the longitudinal direction of the main wall parts (first direction) is closer to the vehicle width direction than the front-and-rear direction of the vehicle body. Note that, in the case of using the structural member 10 illustrated in FIG. 23 as a dash cross member, for example, a dash panel can be utilized as the second member 10b (see FIG. 23).

Further, referring to FIG. 32 and FIG. 33, for example, the aforementioned structural member 50 (see FIG. 30) can be utilized in the vehicle body 80 as cross members (a floor cross member 88 and a rear cross member 90 and the like)

or a torque box 92 in a manner so that the longitudinal direction of the main wall parts (first direction) is closer to the vehicle width direction than the front-and-rear direction of the vehicle body. Note that, in the case of using the structural member 50 illustrated in FIG. 30 as the torque box 92, for example, a dash panel may be utilized as the second member 50*b*, and the first member 50*a* may be welded to the underside of the dash panel. In other words, the structural member 50 may be provided in a manner so that the top plate part 56 of the first member 50*a* functions as a lower wall part and the second member 50*b* (dash panel) functions as an upper wall part.

As described above, in a case where the automobile structural member is arranged in a manner so that the longitudinal direction of the main wall parts (first direction) is closer to the vehicle width direction than the front-and-rear direction of the vehicle body, the second direction (see FIGS. 23, 29 and 30) is closer to the front-and-rear direction of the vehicle body than the vehicle width direction.

Here, in a case where the automobile is subjected to a frontal collision or a rear collision, a load in the front-and-rear direction acts on the front bumper beam 84 or the rear bumper beam 86. In addition, in a case where the automobile is subjected to a frontal collision, a load in the front-and-rear direction is applied from a tunnel part 94 to the rear cross member 90, and a bending load in the front-and-rear direction is applied from the front side member 96 to the dash cross member (not diagrammatically represented) and the torque box 92. With respect to these points, in a case where automobile structural members according to the present embodiments are used as the front bumper beam 84, the rear bumper beam 86, the rear cross member 90, the dash cross member and the torque box 92 (hereinafter, referred to as "bumper beams and the like") as described above, if the automobile is subjected to a frontal collision or a rear collision, a load in the second direction (front-and-rear direction of the vehicle body) will act on the automobile structural members (bumper beams and the like). As mentioned above, the automobile structural members according to the present embodiments have excellent strength with respect to a load in the second direction. Accordingly, by utilizing automobile structural members according to the present embodiments as the bumper beams and the like, even in a case where the automobile is subjected to a frontal collision or a rear collision, the collision energy can be adequately absorbed at the bumper beams and the like. By this means, the safety inside the cabin at the time of a frontal collision or the time of a rear collision can be enhanced.

In addition, in a case where the automobile is subjected to a side impact, a bending load in the front-and-rear direction is applied from the side sill 82 to the floor cross member 88. With respect to this point, in a case where an automobile structural member according to the present embodiments is utilized as the floor cross member 88 as described above, if the automobile is subjected to a side impact, a load in the second direction (front-and-rear direction) will act on the automobile structural member (floor cross member 88). As mentioned above, the automobile structural members according to the present embodiments have excellent strength with respect to a load in the second direction. Accordingly, by utilizing an automobile structural member according to the present embodiments as the floor cross member 88, even in a case where the automobile is subjected to a side impact, the collision energy can be adequately absorbed at the floor cross member 88. By this means, the safety inside the cabin at the time of a side impact can be enhanced.

Note that, although in the foregoing embodiments cases are described in which the automobile structural member is composed of one member (first member) or two members (first member and second member), the automobile structural member may be composed of three or more members in accordance with the structure of the vehicle body.

INDUSTRIAL APPLICABILITY

According to the present invention, an automobile structural member which is light in weight and which has excellent strength with respect to a collision is obtained.

REFERENCE SIGNS LIST

10, 30, 50 Automobile structural member
80 Vehicle body
100, 100*a*, 100*b*, 100*c* Analysis model

The invention claimed is:

1. An automobile structural member having a sheet-like first wall part, a sheet-like second wall part which faces the first wall part in a thickness direction of the first wall part, and a sheet-like third wall part which connects the first wall part and the second wall part,
wherein:
at least one of the first wall part and the second wall part has
a sheet-like main wall part which has a longitudinal direction in a direction along a connecting part with the third wall part and has at least two through-holes formed so as to be aligned along the longitudinal direction, and
at least two auxiliary wall parts which are provided so as to rise from the main wall part;
one of the two auxiliary wall parts is provided so as to rise in a thickness direction of the main wall part from an edge of one of the two through-holes, and the other of the two auxiliary wall parts is provided so as to rise in the thickness direction from an edge of the other of the two through-holes; and
a distance between the two auxiliary wall parts in the longitudinal direction is 1.4 times or less a width of the main wall part at a portion between the two auxiliary wall parts,
wherein each of the first wall part and the second wall part has the main wall part and the at least two auxiliary wall parts.

2. The automobile structural member according to claim 1, wherein:
as seen from the thickness direction of the main wall part, at one side and the other side of the through-hole in the longitudinal direction, the auxiliary wall part intersects with a straight line that passes through a center of the through-hole and is parallel to the longitudinal direction.

3. The automobile structural member according to claim 1, wherein:
the distance between the two auxiliary wall parts is 0.2 times or more the width of the main wall part at the portion between the two auxiliary wall parts.

4. The automobile structural member according to claim 1, wherein:
the at least two auxiliary wall parts of the first wall part are provided so as to rise toward the second wall part side, and the at least two auxiliary wall parts of the second wall part are provided so as to rise toward the first wall part side.

5. The automobile structural member according to claim 1, wherein:
in the thickness direction of the main wall part, a distance between a front end of the auxiliary wall and the main wall part is 2.8 mm or more.

6. The automobile structural member according to claim 1, wherein:
each of the at least two auxiliary wall parts has a cylindrical shape.

7. The automobile structural member according to claim 1, wherein:
a length of the auxiliary wall in a width direction of the main wall part is within a range of 0.2 times to 1.0 times a width of the main wall part at a cross section which passes through a center of the through-hole and is perpendicular to the longitudinal direction.

8. The automobile structural member according to claim 1, wherein:
the auxiliary wall part includes at least two walls which are provided spaced apart from each other in a circumferential direction of the through-hole,
one of the two walls is provided on one side of the through-hole in the longitudinal direction, and the other of the two walls is provided on the other side of the through-hole in the longitudinal direction, and
a length of each of the two walls in a width direction of the main wall part is within a range of 0.2 times to 1.0 times a width of the main wall part at a cross section which passes through a center of the through-hole and which is perpendicular to the longitudinal direction.

9. The automobile structural member according to claim 1, wherein:
in a vehicle body, the first wall part and the second wall part face each other in a front-and-rear direction, and the longitudinal direction is closer to a vertical direction than a vehicle width direction and the front-and-rear direction.

10. The automobile structural member according to claim 9, wherein:
the automobile structural member is a center pillar.

11. The automobile structural member according to claim 10, wherein:
the at least two auxiliary wall parts are provided at positions that are lower than a center in the vertical direction.

12. The automobile structural member according to claim 1, wherein:
in a vehicle body, the first wall part and the second wall part face each other in a vertical direction, and the longitudinal direction is closer to a vehicle width direction or a front-and-rear direction than the vertical direction.

13. The automobile structural member according to claim 12, wherein:
the automobile structural member is a side sill, a bumper beam, a cross member or a torque box.

14. A vehicle body including:
an automobile structural member having a sheet-like first wall part, a sheet-like second wall part which faces the first wall part in a thickness direction of the first wall part, and a sheet-like third wall part which connects the first wall part and the second wall part,
wherein:
at least one of the first wall part and the second wall part has
a sheet-like main wall part which has a longitudinal direction in a direction along a connecting part with the third wall part and has at least two through-holes formed so as to be aligned along the longitudinal direction, and
at least two auxiliary wall parts which are provided so as to rise from the main wall part;
one of the two auxiliary wall parts is provided so as to rise in a thickness direction of the main wall part from an edge of one of the two through-holes, and the other of the two auxiliary wall parts is provided so as to rise in the thickness direction from an edge of the other of the two through-holes; and
a distance between the two auxiliary wall parts in the longitudinal direction is 1.4 times or less a width of the main wall part at a portion between the two auxiliary wall parts,
wherein each of the first wall part and the second wall part has the main wall part and the at least two auxiliary wall parts.

15. The automobile structural member according to claim 1, wherein:
a ratio of a length of each of the two through-holes in a width direction of the main wall part with respect to the width of the main wall part is within a range of 0.3 to 1.0.

* * * * *